US012621876B2

(12) United States Patent
Lin et al.

(10) Patent No.: US 12,621,876 B2
(45) Date of Patent: May 5, 2026

(54) METHOD AND APPARATUS FOR RANDOM ACCESS

(71) Applicant: Telefonaktiebolaget LM Ericsson (publ), Stockholm (SE)

(72) Inventors: Zhipeng Lin, Nanjing (CN); Robert Mark Harrison, Grapevine, TX (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 121 days.

(21) Appl. No.: 17/594,604

(22) PCT Filed: Apr. 27, 2020

(86) PCT No.: PCT/EP2020/061642
§ 371 (c)(1),
(2) Date: Oct. 22, 2021

(87) PCT Pub. No.: WO2020/225009
PCT Pub. Date: Nov. 12, 2020

(65) Prior Publication Data
US 2022/0225436 A1 Jul. 14, 2022

(30) Foreign Application Priority Data

May 3, 2019 (WO) ................. PCT/CN2019/085434

(51) Int. Cl.
*H04W 74/08* (2009.01)
*H04W 74/00* (2009.01)
(52) U.S. Cl.
CPC ..... *H04W 74/0866* (2013.01); *H04W 74/006* (2013.01)

(58) Field of Classification Search
CPC ......................... H04W 74/006; H04W 74/0866
See application file for complete search history.

(56) References Cited

U.S. PATENT DOCUMENTS 10,856,239 B2 * 12/2020 Jeon ...................... H04W 52/36
11,197,324 B2 12/2021 Abedini et al.
(Continued)

FOREIGN PATENT DOCUMENTS

CN 105657807 A 6/2016
CN 106416115 A 2/2017
(Continued)

OTHER PUBLICATIONS

Decision to grant a European patent, EP App. No. 20723314.9, dated Mar. 2, 2023, 2 pages.
(Continued)

*Primary Examiner* — Liton Miah
(74) *Attorney, Agent, or Firm* — Nicholson De Vos Webster & Elliott LLP

(57) ABSTRACT

A method for random access which may be performed by a terminal device comprises receiving configuration information for a random access procedure from a network node. The method further comprises determining an association between random access resource and shared channel resource for the random access procedure, according to the configuration information. The association is based at least in part on a configuration of the shared channel resource. An association between signaling transmissions in a random access procedure can be configured flexibly and efficiently.

17 Claims, 17 Drawing Sheets

Example:
- #SSBs = 8
- M = 32 (i.e. 2 SSBs per PRACH occasion)
- PRACH FDM = 2
- PRACH format A3 (2 TD occasion/slot)
- PRACH configuration period = 20 ms
- 2 PRACH slots per configuration period

| Frequency | 1 PRACH slot | | 1 PRACH occasion | | |
|---|---|---|---|---|---|
| | Preambles 32-63 map to SSB3 Preambles 0-31 map to SSB2 | Preambles 32-63 map to SSB7 Preambles 0-31 map to SSB6 | Preambles 32-63 map to SSB3 Preambles 0-31 map to SSB2 | Preambles 32-63 map to SSB7 Preambles 0-31 map to SSB6 | (Then repeats in next PRACH configuration period) |
| | Preambles 32-63 map to SSB1 Preambles 0-31 map to SSB0 | Preambles 32-63 map to SSB5 Preambles 0-31 map to SSB4 | Preambles 32-63 map to SSB1 Preambles 0-31 map to SSB0 | Preambles 32-63 map to SSB5 Preambles 0-31 map to SSB4 | |

0 ms → 1 PRACH configuration period → 20 ms → Time

(56) References Cited

U.S. PATENT DOCUMENTS

| | | | | | |
|---|---|---|---|---|---|
| 11,219,062 | B2 * | 1/2022 | Jeon | | H04B 7/06964 |
| 11,284,451 | B2 * | 3/2022 | Cirik | | H04W 72/1263 |
| 11,432,334 | B2 * | 8/2022 | Zhang | | H04W 74/0833 |
| 11,882,591 | B2 * | 1/2024 | Lei | | H04W 74/0836 |
| 2013/0308575 | A1 | 11/2013 | Chen et al. | | |
| 2015/0289292 | A1 * | 10/2015 | Sun | | H04W 74/0833 |
| | | | | | 370/329 |
| 2016/0338111 | A1 | 11/2016 | Han et al. | | |
| 2018/0205516 | A1 | 7/2018 | Jung et al. | | |
| 2018/0220450 | A1 | 8/2018 | Aiba et al. | | |
| 2018/0279136 | A1 | 9/2018 | Tsai et al. | | |
| 2018/0323855 | A1 | 11/2018 | Noh et al. | | |
| 2019/0037605 | A1 | 1/2019 | Agiwal et al. | | |
| 2019/0045566 | A1 | 2/2019 | Wu | | |
| 2019/0052343 | A1 | 2/2019 | Li et al. | | |
| 2019/0387546 | A1 | 12/2019 | Li et al. | | |
| 2020/0053772 | A1 | 2/2020 | Pan et al. | | |
| 2020/0288506 | A1 | 9/2020 | Lei et al. | | |
| 2020/0314673 | A1 | 10/2020 | Deogun et al. | | |
| 2020/0351948 | A1 * | 11/2020 | Lei | | H04L 27/261 |
| 2021/0120581 | A1 | 4/2021 | Kim | | |
| 2021/0212002 | A1 | 7/2021 | Jung et al. | | |
| 2021/0345424 | A1 | 11/2021 | Cirik et al. | | |
| 2021/0410182 | A1 | 12/2021 | Zhang et al. | | |
| 2022/0015156 | A1 | 1/2022 | Xu | | |
| 2022/0070929 | A1 * | 3/2022 | Jeon | | H04W 74/0808 |
| 2022/0070941 | A1 * | 3/2022 | Farag | | H04W 74/006 |
| 2022/0124816 | A1 * | 4/2022 | Farag | | H04L 27/261 |

FOREIGN PATENT DOCUMENTS

| | | | |
|---|---|---|---|
| CN | 108092754 | A | 5/2018 |
| CN | 109076364 | A | 12/2018 |
| CN | 109076378 | A | 12/2018 |
| CN | 109327913 | A | 2/2019 |
| EP | 4114124 | A1 | 1/2023 |
| EP | 4271020 | A2 | 11/2023 |
| JP | 2022-528627 | A | 6/2022 |
| WO | 2017059720 | A2 | 4/2017 |
| WO | 2018133437 | A1 | 7/2018 |
| WO | 2018/144586 | A1 | 8/2018 |
| WO | 2018/170880 | A1 | 9/2018 |
| WO | 2018/232090 | A1 | 12/2018 |
| WO | 2020/083190 | A1 | 4/2020 |
| WO | 2020/168285 | A1 | 8/2020 |
| WO | 2020/199000 | A1 | 10/2020 |
| WO | 2020216739 | A1 | 10/2020 |
| WO | 2020/225009 | A2 | 11/2020 |
| WO | 2020221099 | A1 | 11/2020 |

OTHER PUBLICATIONS

Decision to Grant, JP App. No. 2021-564760, dated Feb. 17, 2023, 6 pages (2 pages of English Translation and 4 pages of Original Document).

Ericsson, "Channel Structure for Two-Step RACH", 3GPP TSG-RAN WG1 Meeting #97, R1-1907180, May 13-17, 2019, 8 pages.

LG Electronics, "RACH procedure", 3GPP TSG RAN WG1 Meeting #91, R1-1719898, Nov. 27-Dec. 1, 2017, 11 pages.

Notice of Reasons for Rejection, JP App. No. 2021-562087, dated Feb. 28, 2023, 7 pages (3 pages of English Translation and 4 pages of Original Document).

Communication pursuant to Article 94(3) EPC, EP App. No. 20723295.0, dated Feb. 14, 2023, 6 pages.

CATT, "Discussion on Channel Structure for 2-step RACH", 3GPP TSG RAN WG1 #96bis, R1-1904542, Apr. 8-12, 2019, 5 pages.

Communication pursuant to Article 94(3) EPC, EP App. No. 20723295.0, dated Aug. 19, 2022, 9 pages.

Huawei, HiSilicon, "RACH type switching between 2-steps, 4-steps RACH and CFRA," 3GPP TSG-RAN WG2 Meeting 105bis, R2-1904112, Apr. 8-Apr. 12, 2019, 9 pages.

Intel Corporation, "Channel structure for two-step RACH", 3GPP TSG RAN WG1 #96, R1-1902466, Feb. 25-Mar. 1, 2019, 9 pages.

Intention to Grant, EP App. No. 20723314.9, dated Oct. 24, 2022, 6 pages.

International Preliminary Report on Patentability, PCT App. No. PCT/CN2020/086441, dated Nov. 11, 2021, 7 pages.

International Preliminary Report on Patentability, PCT App. No. PCT/EP2020/061075, dated Jun. 16, 2021, 20 pages.

International Preliminary Report on Patentability, PCT App. No. PCT/EP2020/061642, dated Nov. 18, 2021, 6 pages.

International Search Report and Written Opinion, PCT App. No. PCT/CN2020/086441, dated Jul. 14, 2020, 8 pages.

International Search Report and Written Opinion, PCT App. No. PCT/EP2020/061075, dated Jul. 9, 2020, 12 pages.

International Search Report and Written Opinion, PCT App. No. PCT/EP2020/061642, dated Nov. 26, 2020, 8 pages.

Nokia, Nokia Shanghai Bell, "On 2-step RACH Procedure," 3GPP TSG RAN WG1 #96, R1-1902136, Feb. 25-Mar. 1, 2019, 12 pages.

Notice of Reasons for Rejection, JP App. No. 2021-562087, dated Nov. 15, 2022, 6 pages (3 pages of English Translation and 3 pages of Original Document).

Notice of Reasons for Rejection, JP App. No. 2021-564760, dated Oct. 11, 2022, 10 pages (5 pages of English Translation and 5 pages of Original Document).

Office Action, IN App. No. 202147054434, dated Mar. 25, 2022, 7 pages.

Supplementary European search report and Search Opinion, EP App. No. 20798892.4, dated May 11, 2022, 10 pages.

VIVO, "Discussion on channel structure for 2-step RACH", 3GPP TSG RAN WG1 #96, R1-1901669, Feb. 25-Mar. 1, 2019, 5 pages.

VIVO, "Discussion on channel structure for 2-step RACH", 3GPP TSG RAN WG1 #97, R1-1906124, May 13-17, 2019, 15 pages.

Written Opinion of the International Preliminary Examining Authority, PCT App. No. PCT/EP2020/061075, dated Mar. 11, 2021, 8 pages.

ZTE, "Summary of 7.2.1.1 Channel Structure for Two-step RACH," 3GPP TSG RAN WG1 #96, R1-1903435, Feb. 25-Mar. 1, 2019, 28 pages.

ZTE, "Summary of 7.2.1.2 Procedure for Two-step RACH," Feb. 25-Mar. 1, 2019, 12 pages, 3GPP TSG RAN WG1 #96, R1-1903436, Athens, Greece.

Nokia et al., "On 2-step RACH Procedure," Apr. 8-12, 2019, 16 pages, 3GPP TSG RAN WG1 #96bis, R1-1904716, Xi'an, China.

Qualcomm Incorporated, "Procedures for Two-Step RACH," Apr. 8-12, 2019, 12 pages, 3GPP TSG-RAN WG1 Meeting #96Bis, R1-1904993, Xi'an, China.

CAICT, "Considerations on Procedure for Two-step RACH," Apr. 8-12, 2019, 10 pages, 3GPP TSG RAN WG1 Meeting #96bis, R1-1905126, Xi'an, China.

ZTE Corporation et al., "New work item: 2-step RACH for NR," Dec. 10-13, 2018, 5 pages, 3GPP TSG RAN Meeting #82, RP-182894, Sorrento, Italy.

Communication under Rule 71(3) EPC, EP App. No. 20723295.0, dated Sep. 1, 2023, 8 pages.

Decision to Grant, JP App. No. 2021-562087, dated Jun. 22, 2023, 5 pages (2 pages of English Translation and 3 pages of Original Document).

Extended European Search Report, EP App. No. 23156218.2, dated Jun. 2, 2023, 5 pages.

Decision to grant, EP App. No. 20723295.0, Jan. 5, 2024, 2 pages.

First Office Action, CN App. No. 202080020128.8, Feb. 5, 2024, 10 pages (5 pages of English Translation and 5 pages of Original Document).

Non-Final Office Action, U.S. Appl. No. 17/594,601, Feb. 6, 2024, 25 pages.

Non-Final Office Action, U.S. Appl. No. 17/594,603, Dec. 15, 2023, 14 pages.

Office Action, CN App. No. 202080010879.1, Nov. 30, 2023, 15 pages (7 pages of English Translation and 8 pages of Original Document).

Samsung, "Channel Structure for Two-Step RACH," Apr. 8 -12, 2019, R1-1904392, 3GPP TSG RAN WG1 #96bis, Xi'an, China, 8 pages.

(56)     References Cited

OTHER PUBLICATIONS

Extended European Search Report, EP App. No. 24153420.5, Apr. 18, 2024, 13 pages.

Final Office Action, U.S. Appl. No. 17/594,603, May 20, 2024, 12 pages.

First Office Action CN App. No. 202080030413.8, Feb. 29, 2024, 10 pages (4 pages of English Translation and 6 pages fo Original Document).

Nokia, "Increasing Tx opportunities for RA messages", Feb. 25-Mar. 1, 2019, 5 pages, 3GPP TSG-RAN WG2 Meeting #105, R2-1901259, Athens, Greece.

Final Office Action, U.S. Appl. No. 17/594,601, Aug. 23, 2024, 23 pages.

Office Action, EP App. No. 20798892.4, Oct. 23, 2024, 7 pages.

* cited by examiner gNB

UE

101 SS/PBCH block:
PSS, SSS, PBCH

102 System information (RMSI, OSI)

103 PRACH (msg1)

104 RAR (msg2)

105 PUSCH (msg3)

106 CRM (msg4)

Example:
- #SSBs-per-PRACH-occasion = 4
- #CB-preambles-per-SSB = 4

64 preambles configured for the cell (per PRACH occasion)

0 1 ... 16 ... 32 ... 48 ... 63

Map to SSB 0 | SSB 1 | SSB 2 | SSB 3

= Preamble indices for CBRA

= Preamble indices for CFRA

PRACH Slot

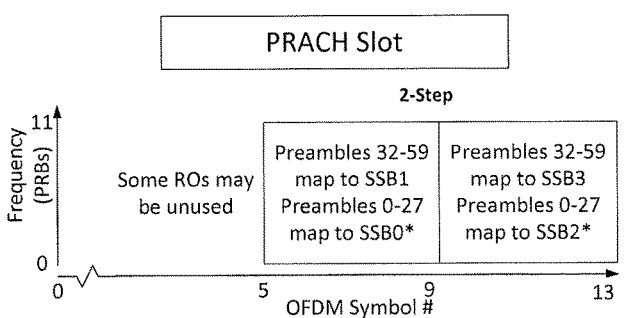

2-Step

Some ROs may be unused | Preambles 32-59 map to SSB1 Preambles 0-27 map to SSB0* | Preambles 32-59 map to SSB3 Preambles 0-27 map to SSB2*

*Remaining preambles can be used by contention free*

PUSCH Occasion

PUSCH RU: {DMRS$_0$},{DMRS$_1$}
PRACH: {Preamble Set$_0$},{Preamble Set$_1$}

Example:
- Each PO is 4, 8, or 16 PRBs x 3 symbols
- 2 PUSCH RUs in 1 PO
- Each PUSCH RU associated with one of two DMRS ports;
- M=2 preambles / PUSCH RU msgA PUSCH slot

K=4

| SSB0 | SSB1 | SSB2 | SSB3 |
|---|---|---|---|
| PO: {3} PUSCH RU: {6},{7} PRACH: {3,11},{7,15} | PO: {10} PUSCH RU: {20},{21} PRACH: {35,43},{39,47} | PO: {3} PUSCH RU: {6},{7} PRACH: {3,11},{7,15} | PO: {10} PUSCH RU: {20},{21} PRACH: {35,43},{39,47} |
| PO: {2} PUSCH RU: {4},{5} PRACH: {2,10},{6,14} | PO: {9} PUSCH RU: {18},{19} PRACH: {34,42},{38,46} | PO: {2} PUSCH RU: {4},{5} PRACH: {2,10},{6,14} | PO: {9} PUSCH RU: {18},{19} PRACH: {34,42},{38,46} |
| PO: {1} PUSCH RU: {2},{3} PRACH: {1,9},{5,13} | PO: {8} PUSCH RU: {16},{17} PRACH: {33,41}.{37,45} | PO: {1} PUSCH RU: {2},{3} PRACH: {1,9},{5,13} | PO: {8} PUSCH RU: {16},{17} PRACH: {33,41}.{37,45} |
| PO: {0} PUSCH RU: {0},{1} PRACH: {0,8},{4,12} | PO: {7} PUSCH RU: {14},{15} PRACH: {32,40},{36,44} | PO: {0} PUSCH RU: {0},{1} PRACH: {0,8},{4,12} | PO: {7} PUSCH RU: {14},{15} PRACH: {32,40},{36,44} |

Remaining symbols not used for msgA

• • •

OFDM Symbol #

K=8

| SSB0 | SSB1 | SSB2 | SSB3 |
|---|---|---|---|
| PO{5} PUSCH RU: {10},{11} PRACH: {17,21},{19,23} | PO{12} PUSCH RU: {24},{25} PRACH: {49,53},{51,55} | PO{5} PUSCH RU: {10},{11} PRACH: {17,21},{19,23} | PO{12} PUSCH RU: {24},{25} PRACH: {49,53},{51,55} |
| PO{4} PUSCH RU: {8},{9} PRACH: {16,20},{18,22} | PO{11} PUSCH RU: {22},{23} PRACH: {48,52},{50,54} | PO{4} PUSCH RU: {8},{9} PRACH: {16,20},{18,22} | PO{11} PUSCH RU: {22},{23} PRACH: {48,52},{50,54} |

• • •

OFDM Symbol #

| SSB0 | SSB1 | SSB2 | SSB3 |
|---|---|---|---|
| PO{6} PUSCH RU: {12},{13} PRACH: {24,26},{25,27} | PO{13} PUSCH RU: {26},{27} PRACH: {56,58},{57,59} | PO{6} PUSCH RU: {12},{13} PRACH: {24,26},{25,27} | PO{13} PUSCH RU: {26},{27} PRACH: {56,58},{57,59} |

K=16

• • •

OFDM Symbol #

METHOD AND APPARATUS FOR RANDOM ACCESS

CROSS-REFERENCE TO RELATED APPLICATIONS

This application is a National stage of International Application No. PCT/EP2020/061642, filed Apr. 27, 2020, which claims priority to International Application No. PCT/CN2019/085434, filed May 3, 2019, which are hereby incorporated by reference.

FIELD OF THE INVENTION

The present disclosure generally relates to communication networks, and more specifically, to method and apparatus for random access.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE) and new radio (NR) networks are expected to achieve high traffic capacity and end-user data rate with lower latency. In order to connect to a network node, a random access (RA) procedure may be initiated for a terminal device. In the RA procedure, system information (SI) and synchronization signals (SS) as well as the related radio resource and transmission configuration can be informed to the terminal device by control information from the network node. The RA procedure can enable the terminal device to establish a session for a specific service with the network node. Thus, it is desirable to enhance the configuration and performance of the RA procedure.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

A wireless communication network such as a NR/5G network may be able to support flexible network configuration. Various signaling approaches (e.g., a four-step approach, a two-step approach, etc.) may be used for a RA procedure of a terminal device to set up a connection with a network node. For the RA procedure, there may be a specific association between a synchronization signal and physical broadcast channel block (which is also known as a SS/PBCH block or SSB for short) and a time-frequency physical random access channel (PRACH) occasion (which is also known as a RA occasion or RO for short). In a two-step RA procedure, the terminal device can transmit a RA preamble together with the physical uplink shared channel (PUSCH) in a message (which is also known as message A or msgA for short) to the network node, and receive a response message (which is also known as message B or msgB for short) from the network node. The msgA PUSCH can be transmitted in a PUSCH occasion (PO) configured with one or more resource units (RUs), and the RA preamble can be transmitted in a RO. It may be desirable to configure signaling transmissions for a RA procedure more flexibly and efficiently while implementing association of resource configuration in a RO and a PO.

Various embodiments of the present disclosure propose a solution for RA, which can support adaptive association configuration for a RA procedure such as a two-step RA procedure, for example, by providing flexibility for mapping of a SSB associated preamble in a RO to a PUSCH RU in a PO, so as to increase diversity of resource configuration and improve performance of the RA procedure.

It can be realized that the terms "PRACH occasion", "random access channel (RACH) occasion" or "RA occasion" mentioned herein may refer to a time-frequency resource usable for the preamble transmission in a RA procedure, which may also be referred to as "random access occasion (RO)". These terms may be used interchangeably in this document. In accordance with some exemplary embodiments, a RO usable for the preamble transmission in two-step RA may be called a two-step RO, while a RO usable for the preamble transmission in four-step RA may be called a four-step RO.

Similarly, it can be realized that the terms "PUSCH occasion", "uplink shared channel occasion" or "shared channel occasion" mentioned herein may refer to a time-frequency resource usable for PUSCH transmission in a RA procedure, which may also be referred to as "physical uplink shared channel occasion (PO)". These terms may be used interchangeably in this document.

According to a first aspect of the present disclosure, there is provided a method performed by a network node. The method comprises determining an association between RA resource and shared channel resource for a RA procedure, based at least in part on a configuration of the shared channel resource. The method further comprises transmitting configuration information about the association for the RA procedure to a terminal device.

According to a second aspect of the present disclosure, there is provided an apparatus which may be implemented as a network node. The apparatus comprises one or more processors and one or more memories comprising computer program codes. The one or more memories and the computer program codes are configured to, with the one or more processors, cause the apparatus at least to perform any step of the method according to the first aspect of the present disclosure.

According to a third aspect of the present disclosure, there is provided a computer-readable medium having computer program codes embodied thereon which, when executed on a computer, cause the computer to perform any step of the method according to the first aspect of the present disclosure.

According to a fourth aspect of the present disclosure, there is provided an apparatus which may be implemented as a network node. The apparatus comprises a determining unit and a transmitting unit. In accordance with some exemplary embodiments, the determining unit is operable to carry out at least the determining step of the method according to the first aspect of the present disclosure. The transmitting unit is operable to carry out at least the transmitting step of the method according to the first aspect of the present disclosure.

According to a fifth aspect of the present disclosure, there is provided a method performed by a terminal device such as a user equipment (UE). The method comprises receiving configuration information for a RA procedure from a network node. The method further comprises determining an association between RA resource and shared channel resource for the RA procedure, according to the configuration information. The association is based at least in part on a configuration of the shared channel resource.

Optionally, the method according to the fifth aspect of the present disclosure may further comprise performing the RA procedure, according to the determination of the association between the RA resource and the shared channel resource.

According to a sixth aspect of the present disclosure, there is provided an apparatus which may be implemented as a terminal device. The apparatus comprises one or more processors and one or more memories comprising computer program codes. The one or more memories and the computer program codes are configured to, with the one or more processors, cause the apparatus at least to perform any step of the method according to the fifth aspect of the present disclosure.

According to a seventh aspect of the present disclosure, there is provided a computer-readable medium having computer program codes embodied thereon which, when executed on a computer, cause the computer to perform any step of the method according to the fifth aspect of the present disclosure.

According to an eighth aspect of the present disclosure, there is provided an apparatus which may be implemented as a terminal device. The apparatus comprises a receiving unit and a determining unit. In accordance with some exemplary embodiments, the receiving unit is operable to carry out at least the receiving step of the method according to the fifth aspect of the present disclosure. The determining unit is operable to carry out at least the determining step of the method according to the fifth aspect of the present disclosure.

In accordance with an exemplary embodiment, the RA procedure may be the two-step RA procedure.

In accordance with an exemplary embodiment, the configuration of the shared channel resource may comprise: configuration of shared channel occasions with one or more sizes by enabling the shared channel occasions to be configured with a variable number of physical resource blocks (PRBs).

In accordance with an exemplary embodiment, the configuration of the shared channel resource may be provisioned by at least one of the terminal device and the network node.

In accordance with an exemplary embodiment, the association between the RA resource and the shared channel resource may comprise: mapping of a preamble in a RA occasion to a RU in a shared channel occasion. Time resource configured for the RU may correspond to an SSB associated with the preamble.

In accordance with an exemplary embodiment, the SSB may be associated with one or more preambles. For example, the one or more preambles may be mapped to one or more shared channel occasions which have at least one size and are configured with the same time resource.

In accordance with an exemplary embodiment, the RU in the shared channel occasion may be identified according to an identification rule. For example, the identification rule may be based at least in part on one or more of the following identification factors:

a demodulation reference signal (DMRS) identifier configured for the RU, where the DMRS identifier can identify at least one of a DMRS antenna port and a DMRS sequence initialization;

a location of the shared channel occasion in frequency domain;

a location of the shared channel occasion in time domain; and a size of the shared channel occasion identifying the number of one or more PRBs and the number of one or more symbols (e.g., orthogonal frequency division multiplexing (OFDM) symbols) occupied by the shared channel occasion.

In accordance with an exemplary embodiment, the identification factors may have different priorities.

In accordance with an exemplary embodiment, the mapping of the preamble in the RA occasion to the RU in the shared channel occasion may be performed according to a mapping rule. For example, the mapping rule may comprise: mapping, in a predetermined order based at least in part on the identification factors, identifiers of preambles in increasing order to identifiers of RUs. The predetermined order may indicate that among the identification factors, the location of the shared channel occasion in time domain has a lowest priority in the mapping of the identifiers.

In accordance with an exemplary embodiment, the predetermined order may further indicate that compared with the DMRS identifier and the location of the shared channel occasion in frequency domain, the size of the shared channel occasion has a lower priority in the mapping of the identifiers.

In accordance with an exemplary embodiment, the predetermined order may further indicate that among the identification factors, the demodulation reference signal identifier has a highest priority in the mapping of the identifiers.

In accordance with an exemplary embodiment, the mapping of the preamble in the RA occasion to the RU in the shared channel occasion may be performed according to a mapping rule. For example, the mapping rule may be based at least in part on one or more of the following mapping factors:

orthogonality of preambles;

a probability of transmission colliding on the shared channel occasion;

frequency resource configured for the RU;

a DMRS port (also called DMRS antenna port) configured for the RU;

a DMRS sequence initialization configured for the RU;

a number of preambles mapped to the RU;

a size of the shared channel occasion; and time resource configured for the RU.

In accordance with an exemplary embodiment, the mapping factors may have different priorities.

In accordance with an exemplary embodiment, the mapping rule may comprise: mapping preambles having consecutive identifiers to different shared channel occasions.

In accordance with an exemplary embodiment, the mapping rule may comprise: mapping preambles associated with the SSB to multiple shared channel occasions with different sizes.

In accordance with an exemplary embodiment, the shared channel occasion associated with the SSB may be configured with time resource different from another shared channel occasion associated with a different SSB.

According to a ninth aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station which may perform any step of the method according to the first aspect of the present disclosure.

According to a tenth aspect of the present disclosure, there is provided a communication system including a host computer. The host computer may comprise processing circuitry configured to provide user data, and a communication interface configured to forward the user data to a cellular network for transmission to a UE. The cellular network may comprise a base station having a radio interface and processing circuitry. The base station's processing circuitry may be configured to perform any step of the method according to the first aspect of the present disclosure.

According to an eleventh aspect of the present disclosure, there is provided a method implemented in a communication system which may include a host computer, a base station and a UE. The method may comprise providing user data at the host computer. Optionally, the method may comprise, at the host computer, initiating a transmission carrying the user data to the UE via a cellular network comprising the base station. The UE may perform any step of the method according to the fifth aspect of the present disclosure.

According to a twelfth aspect of the present disclosure, there is provided a communication system including a host computer. The host computer may comprise processing circuitry configured to provide user data, and a communication interface configured to forward user data to a cellular network for transmission to a UE. The UE may comprise a radio interface and processing circuitry. The UE's processing circuitry may be configured to perform any step of the method according to the fifth aspect of the present disclosure.

According to a thirteenth aspect of the present disclosure, there is provided a method implemented in a communication system which may include a host computer, a base station and a UE. The method may comprise, at the host computer, receiving user data transmitted to the base station from the UE which may perform any step of the method according to the fifth aspect of the present disclosure.

According to a fourteenth aspect of the present disclosure, there is provided a communication system including a host computer. The host computer may comprise a communication interface configured to receive user data originating from a transmission from a UE to a base station. The UE may comprise a radio interface and processing circuitry. The UE's processing circuitry may be configured to perform any step of the method according to the fifth aspect of the present disclosure.

According to a fifteenth aspect of the present disclosure, there is provided a method implemented in a communication system which may include a host computer, a base station and a UE. The method may comprise, at the host computer, receiving, from the base station, user data originating from a transmission which the base station has received from the UE. The base station may perform any step of the method according to the first aspect of the present disclosure.

According to a sixteenth aspect of the present disclosure, there is provided a communication system which may include a host computer. The host computer may comprise a communication interface configured to receive user data originating from a transmission from a UE to a base station. The base station may comprise a radio interface and processing circuitry. The base station's processing circuitry may be configured to perform any step of the method according to the first aspect of the present disclosure.

BRIEF DESCRIPTION OF THE DRAWINGS

The disclosure itself, the preferable mode of use and further objectives are best understood by reference to the following detailed description of the embodiments when read in conjunction with the accompanying drawings, in which:

FIG. 3B is a diagram illustrating exemplary configuration for the preamble to PUSCH RU mapping according to some embodiments of the present disclosure;

DETAILED DESCRIPTION

Figure 1A:
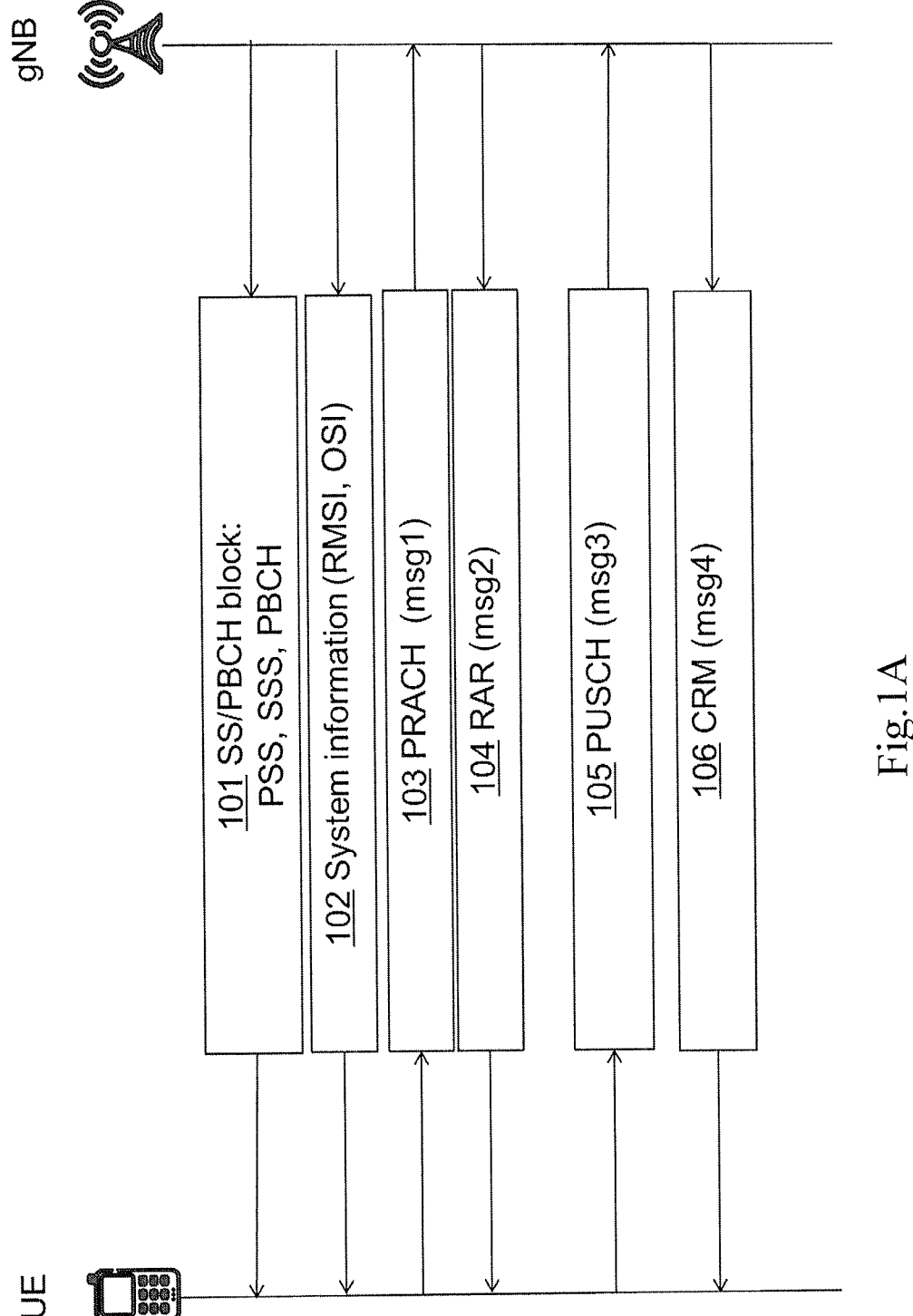
FIG. 1A is a diagram illustrating an exemplary four-step RA procedure according to an embodiment of the present disclosure.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "communication network" refers to a network following any suitable communication standards, such as new radio (NR), long term evolution (LTE), LTE-Advanced, wideband code division multiple access (WCDMA), high-speed packet access (HSPA), and so on. Furthermore, the communications between a terminal device and a network node in the communication network may be performed according to any suitable generation communication protocols, including, but not limited to, the first generation (1G), the second generation (2G), 2.5G, 2.75G, the third generation (3G), 4G, 4.5G, 5G communication protocols, and/or any other protocols either currently known or to be developed in the future.

The term "network node" refers to a network device in a communication network via which a terminal device accesses to the network and receives services therefrom. The network node may refer to a base station (BS), an access point (AP), a multi-cell/multicast coordination entity (MCE), a controller or any other suitable device in a wireless communication network. The BS may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "terminal device" refers to any end device that can access a communication network and receive services therefrom. By way of example and not limitation, the terminal device may refer to a mobile terminal, a user equipment (UE), or other suitable devices. The UE may be, for example, a subscriber station, a portable subscriber station, a mobile station (MS) or an access terminal (AT). The terminal device may include, but not limited to, portable computers, image capture terminal devices such as digital cameras, gaming terminal devices, music storage and playback appliances, a mobile phone, a cellular phone, a smart phone, a tablet, a wearable device, a personal digital assistant (PDA), a vehicle, and the like.

As yet another specific example, in an Internet of things (IoT) scenario, a terminal device may also be called an IoT device and represent a machine or other device that performs monitoring, sensing and/or measurements etc., and transmits the results of such monitoring, sensing and/or measurements etc. to another terminal device and/or a network equipment. The terminal device may in this case be a machine-to-machine (M2M) device, which may in a 3rd generation partnership project (3GPP) context be referred to as a machine-type communication (MTC) device.

As one particular example, the terminal device may be a UE implementing the 3GPP narrow band Internet of things (NB-IoT) standard. Particular examples of such machines or devices are sensors, metering devices such as power meters, industrial machinery, or home or personal appliances, e.g. refrigerators, televisions, personal wearables such as watches etc. In other scenarios, a terminal device may represent a vehicle or other equipment, for example, a medical instrument that is capable of monitoring, sensing and/or reporting etc. on its operational status or other functions associated with its operation.

As used herein, the terms "first", "second" and so forth refer to different elements. The singular forms "a" and "an" are intended to include the plural forms as well, unless the context clearly indicates otherwise. The terms "comprises", "comprising", "has", "having", "includes" and/or "including" as used herein, specify the presence of stated features, elements, and/or components and the like, but do not preclude the presence or addition of one or more other features, elements, components and/or combinations thereof. The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

Wireless communication networks are widely deployed to provide various telecommunication services such as voice, video, data, messaging and broadcasts. As described previously, in order to connect to a network node such as a gNB in a wireless communication network, a terminal device such as a UE may need to perform a RA procedure to exchange essential information and messages for communication link establishment with the network node.

FIG. 1A is a diagram illustrating an exemplary four-step RA procedure according to an embodiment of the present disclosure. As shown in FIG. 1A, a UE can detect a synchronization signal (SS) by receiving 101 an SSB (e.g., a primary synchronization signal (PSS), a secondary synchronization signal (SSS), and physical broadcast channel (PBCH)) from a gNB. The UE can decode 102 some system information (e.g., remaining minimum system information (RMSI) and other system information (OSI)) broadcasted in the downlink (DL). Then the UE can transmit 103 a PRACH preamble (message1/msg1) in the uplink (UL). The gNB can reply 104 with a random access response (RAR, message2/msg2). In response to the RAR, the UE can transmit 105 the UE's identification information (message3/msg3) on physical uplink shared channel (PUSCH). Then the gNB can send 106 a contention resolution message (CRM, message4/msg4) to the UE.

In this exemplary procedure, the UE transmits message3/msg3 on PUSCH after receiving a timing advance command in the RAR, allowing message3/msg3 on PUSCH to be received with timing accuracy within a cyclic prefix (CP). Without this timing advance, a very large CP may be needed in order to be able to demodulate and detect message3/msg3 on PUSCH, unless the communication system is applied in a cell with very small distance between the UE and the gNB. Since a NR system can also support larger cells with a need for providing a timing advance command to the UE, the four-step approach is needed for the RA procedure.

In the NR system, the time and frequency resource on which a PRACH preamble is transmitted can be defined as a PRACH occasion. Different PRACH configurations may be specified for FR1 (Frequency Range 1) paired spectrum, FR1 unpaired spectrum and FR2 (Frequency Range 2) with unpaired spectrum, respectively. The specified PRACH configuration can be maintained in a PRACH configuration table. The time resource and preamble format for PRACH transmission can be configured by a PRACH configuration index, which indicates a row in a PRACH configuration table. For example, at least part of PRACH configurations for preamble format 0 for FR1 unpaired spectrum is shown in Table 1.

sions are configured. The value in the column "Starting symbol" is the symbol index.

In the case of time division duplexing (TDD), semi-statically configured DL parts and/or actually transmitted SSBs can override and invalidate some time-domain PRACH occasions defined in the PRACH configuration table. More specifically, PRACH occasions in the UL part are always valid, and a PRACH occasion within a certain part (e.g., a part with flexible symbols within a NR slot) is valid as long as it does not precede or collide with an SSB in the RACH slot and there are at least Q symbols after the DL part and the last symbol of an SSB. For example, Q may be set as 0 or 2, depending on the PRACH format and subcarrier spacing.

Figure 1B:
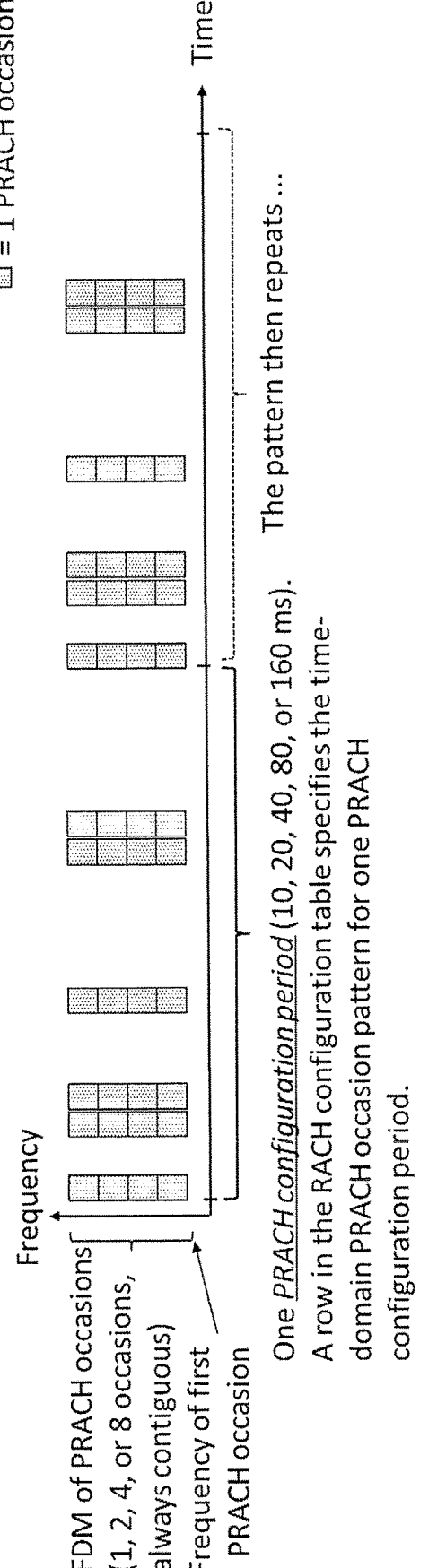
FIG. 1B is a diagram illustrating an exemplary PRACH configuration according to an embodiment of the present disclosure.

FIG. 1B is a diagram illustrating an exemplary PRACH configuration according to an embodiment of the present disclosure. In the frequency domain, a NR system can support multiple frequency-multiplexed PRACH occasions on the same time-domain PRACH occasion. This is mainly motivated by the support of analog beam sweeping in the NR system such that the PRACH occasions associated to one SSB are configured at the same time instance but different frequency locations. As shown in FIG. 1B, the number of PRACH occasions frequency-division multi-

TABLE 1

| PRACH Configuration Index | Preamble format | $n_{SFN}$ mod x = y | | Subframe number | Starting symbol | Number of PRACH slots within a subframe | $N_t^{RA,\ slot}$, number of time-domain PRACH occasions within a PRACH slot | $N_{dur}^{RA}$, PRACH duration |
|---|---|---|---|---|---|---|---|---|
| | | x | y | | | | | |
| 0 | 0 | 16 | 1 | 9 | 0 | — | — | 0 |
| 1 | 0 | 8 | 1 | 9 | 0 | — | — | 0 |
| 2 | 0 | 4 | 1 | 9 | 0 | — | — | 0 |
| 3 | 0 | 2 | 0 | 9 | 0 | — | — | 0 |
| 4 | 0 | 2 | 1 | 9 | 0 | — | — | 0 |
| 5 | 0 | 2 | 0 | 4 | 0 | — | — | 0 |
| 6 | 0 | 2 | 1 | 4 | 0 | — | — | 0 |
| 7 | 0 | 1 | 0 | 9 | 0 | — | — | 0 |
| 8 | 0 | 1 | 0 | 8 | 0 | — | — | 0 |
| 9 | 0 | 1 | 0 | 7 | 0 | — | — | 0 |
| 10 | 0 | 1 | 0 | 6 | 0 | — | — | 0 |
| 11 | 0 | 1 | 0 | 5 | 0 | — | — | 0 |
| 12 | 0 | 1 | 0 | 4 | 0 | — | — | 0 |
| 13 | 0 | 1 | 0 | 3 | 0 | — | — | 0 |
| 14 | 0 | 1 | 0 | 2 | 0 | — | — | 0 |
| 15 | 0 | 1 | 0 | 1, 6 | 0 | | | 0 |
| 16 | 0 | 1 | 0 | 1, 6 | 7 | — | — | 0 |
| 17 | 0 | 1 | 0 | 4, 9 | 0 | — | — | 0 |
| 18 | 0 | 1 | 0 | 3, 8 | 0 | — | — | 0 |
| 19 | 0 | 1 | 0 | 2, 7 | 0 | — | — | 0 |
| 20 | 0 | 1 | 0 | 8, 9 | 0 | — | — | 0 |
| 21 | 0 | 1 | 0 | 4, 8, 9 | 0 | — | — | 0 |
| 22 | 0 | 1 | 0 | 3, 4, 9 | 0 | — | — | 0 |
| 23 | 0 | 1 | 0 | 7, 8, 9 | 0 | — | — | 0 |
| 24 | 0 | 1 | 0 | 3, 4, 8, 9 | 0 | — | — | 0 |
| 25 | 0 | 1 | 0 | 6, 7, 8, 9 | 0 | — | — | 0 |
| 26 | 0 | 1 | 0 | 1, 4, 6, 9 | 0 | — | — | 0 |
| 27 | 0 | 1 | 0 | 1, 3, 5, 7, 9 | 0 | — | — | 0 |

In Table 1, the value of x indicates the PRACH configuration period in number of system frames, and the value of y indicates the system frame within each PRACH configuration period on which the PRACH occasions are configured. For instance, if y is set to 0, then it means that PRACH occasions are only configured in the first frame of each PRACH configuration period. The value in the column "Subframe number" tells on which subframes PRACH occaplexed (FDMed) in one time domain PRACH occasion may be 1, 2, 4, or 8, and the PRACH configuration period may be 10 ms, 20 ms, 40 ms, 80 ms or 160 ms. As mentioned previously, a row in a PRACH/RACH configuration table can specify the time-domain PRACH occasion pattern for one PRACH configuration period.

In accordance with an exemplary embodiment, there are up to 64 sequences that can be used as RA preambles per PRACH occasion in each cell. The radio resource control (RRC) parameter such as totalNumberOfRA-Preambles can be used to determine how many of these 64 sequences are used as RA preambles per PRACH occasion in each cell. The 64 sequences may be configured by including firstly all the available cyclic shifts of a root Zadoff-Chu sequence, and secondly in the order of increasing root index, until 64 preambles have been generated for the PRACH occasion.

According to some exemplary embodiments, there may be an association between an SSB and a PRACH occasion. For example, one-to-one association between an SSB and a PRACH occasion (e.g., one SSB per PRACH occasion) can be supported in the NR system. Similarly, one-to-many and/or many-to-one association between SSB(s) and PRACH occasion(s) can also be supported in the NR system.

Figure 1C:
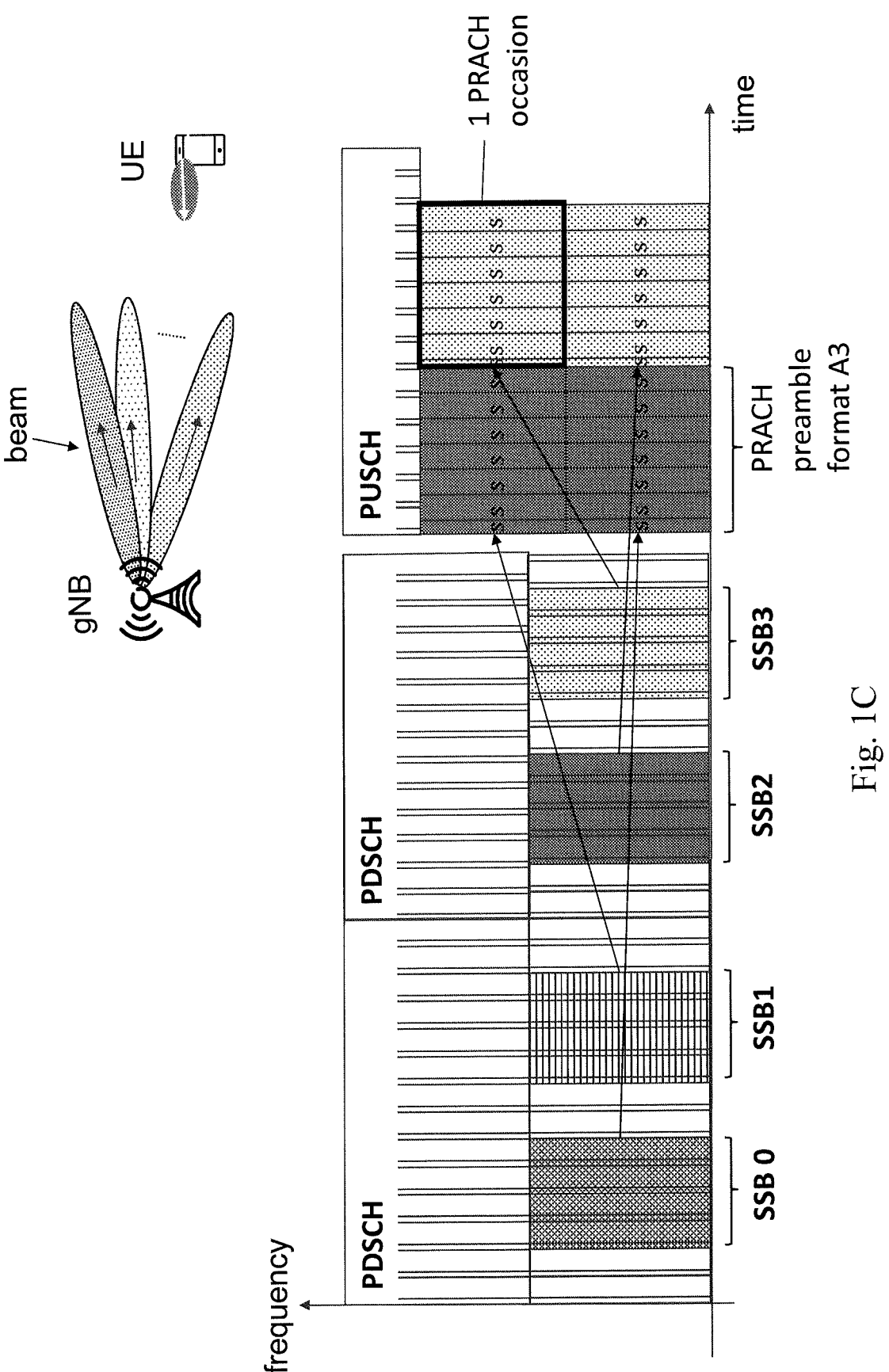
FIGS. 1C-1D are diagrams illustrating examples of an association between an SSB and a PRACH occasion according to some embodiments of the present disclosure.
Figure 1D:
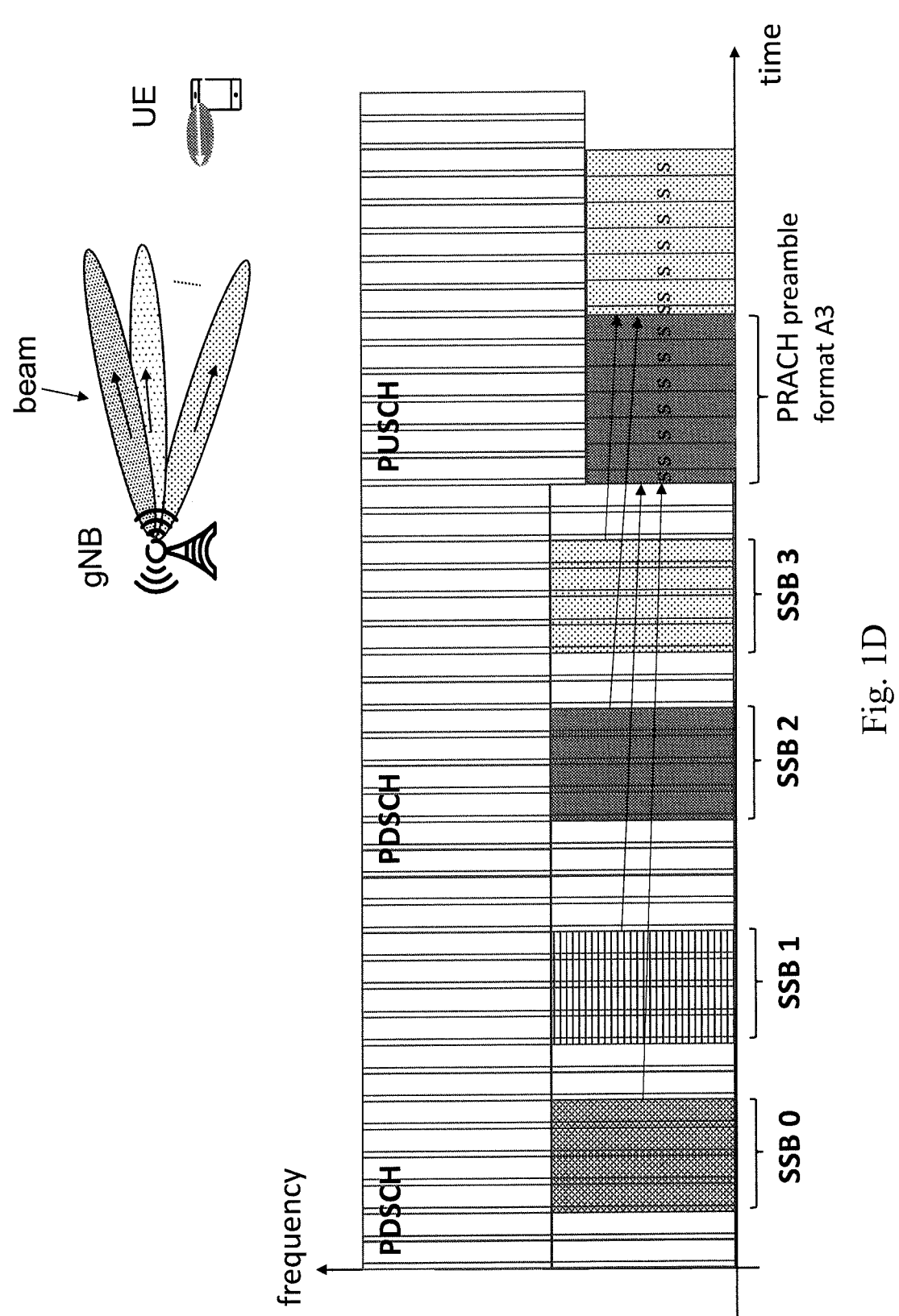

FIGS. 1C-1D are diagrams illustrating examples of an association between an SSB and a PRACH occasion according to some embodiments of the present disclosure. In the example of one SSB per PRACH occasion as shown in FIG. 1C, SSB0, SSB1, SSB2 and SSB3 are associated with four different PRACH occasions, respectively. In the example of two SSBs per PRACH occasion as shown in FIG. 1D, SSB0 and SSB1 are associated with a PRACH occasion, and SSB2 and SSB3 are associated with another PRACH occasion. It can be appreciated that the association between an SSB and a PRACH occasion as shown in FIG. 1C or FIG. 1D is just as an example, and other suitable association between an SSB and a PRACH occasion with a proper PRACH preamble format may also be implemented.

In accordance with an exemplary embodiment, a gNB uses different SSB beams to transmit the respective SSBs to a UE. In response to reception of the SSBs from the gNB, the UE detects the best SSB beam, and select a PRACH preamble from one or more PRACH preambles mapped to the corresponding SSB. Then the UE can send the selected PRACH preamble to the gNB in the associated PRACH occasion. When the gNB detects the PRACH preamble transmitted from the UE, according to the association between the PRACH preamble and the corresponding SSB mapped to the SSB beam, the best SSB beam for this UE is known indirectly by the gNB, so that the best SSB beam can be used for transmitting/receiving signals to/from this UE.

In accordance with some exemplary embodiments, the preambles associated to each SSB can be configured by two RRC parameters ssb-perRACH-OccasionAndCB-PreamblesPerSSB and totalNumberOfRA-Preambles, which may be indicated by an information element (IE) such as RACH-ConfigCommon in a system information block (e.g., SIB1). A specific rule may be defined for mapping an SSB to RA preambles. For example, a UE may be provided with a number N of SSBs associated to one PRACH occasion and a number R of contention based (CB) preambles per SSB per valid PRACH occasion by parameter ssb-perRACH-OccasionAndCB-PreamblesPerSSB. If N<1, one SSB is mapped to 1/N consecutive valid PRACH occasions and R contention based preambles with consecutive indexes associated with the SSB per valid PRACH occasion start from preamble index 0. If N≥1, R contention based preambles with consecutive indexes associated with SSB $n_{SSB}$, $0 \ n_{SSB} \le N-1$, per valid PRACH occasion start from preamble index $$n_{SSB} \cdot N_{preamble}^{total}/N,$$

where $$N_{preamble}^{total}$$

is provided by parameter totalNumberOfRA-Preambles and is an integer multiple of N.

Figure 1E:
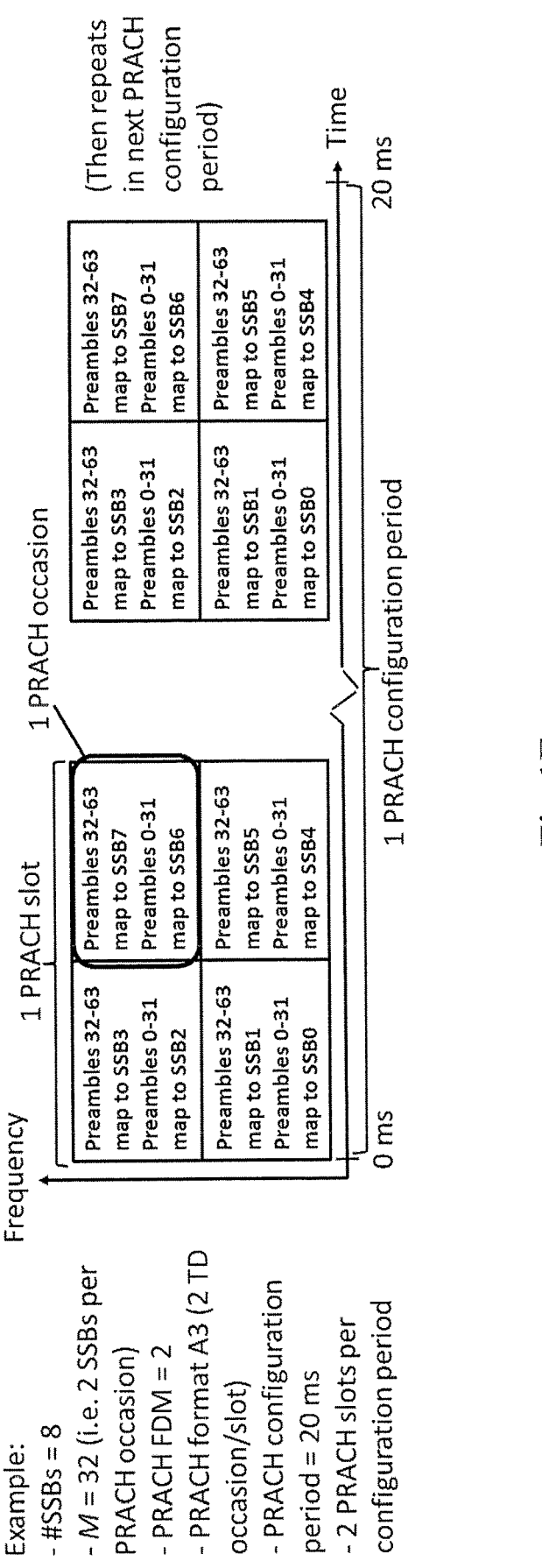
FIG. 1E is a diagram illustrating an example of mapping between an SSB and RA preambles according to an embodiment of the present disclosure.

FIG. 1E is a diagram illustrating an example of mapping between an SSB and RA preambles according to an embodiment of the present disclosure. In this example, the number of PRACH slots in one PRACH configuration period is 2, the number of PRACH occasions in one PRACH slot is 4, and the number of SSBs in one PRACH occasion is 2. As shown in FIG. 1E, the mapping between an SSB and PRACH preambles may be done by consecutively associating $M_{SSB}$ preambles to each SSB, where $$M_{SSB} = N_{preamble}^{total}/N.$$

For instance, the preambles can be taken as follows:
first, in increasing order of preamble indexes within a single PRACH occasion;
second, in increasing order of frequency resource indexes for frequency multiplexed PRACH occasions; and
third, in increasing order of time.

Figure 1F:
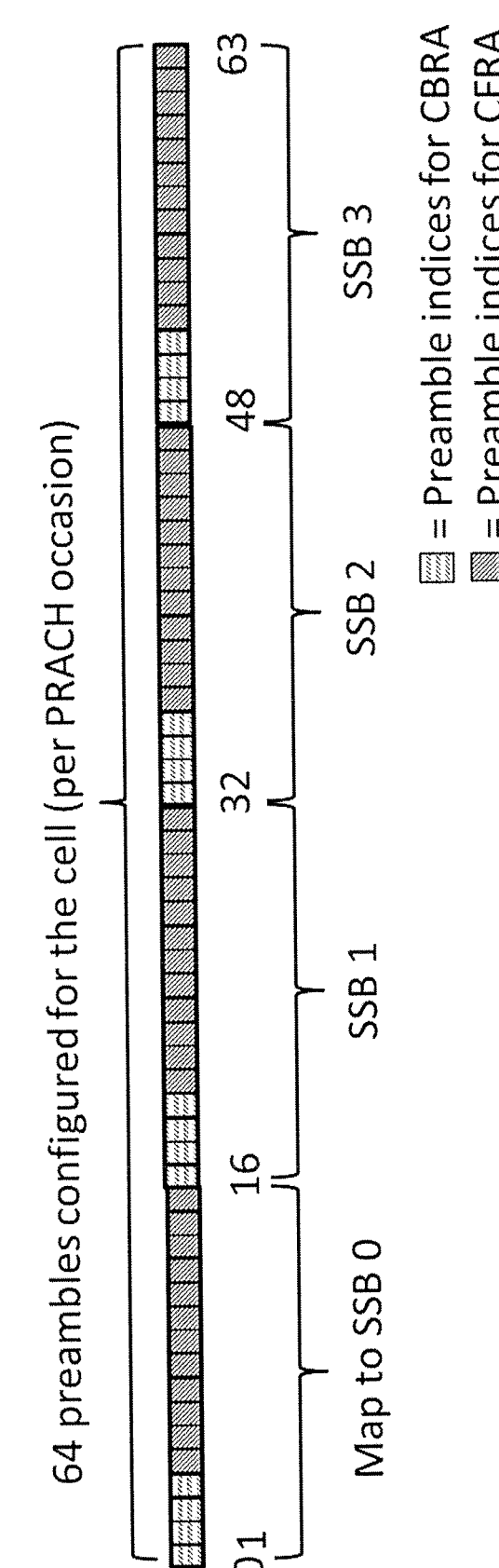
FIG. 1F is a diagram illustrating exemplary preambles per SSB per PRACH occasion according to an embodiment of the present disclosure.

FIG. 1F is a diagram illustrating exemplary preambles per SSB per PRACH occasion according to an embodiment of the present disclosure. In this embodiment, for each SSB, the associated preambles per PRACH occasion are further divided into two sets for contention based random access (CBRA) and contention free random access (CFRA). The number of contention based (CB) preambles per SSB per PRACH occasion may be signaled by a RRC parameter such as CB-preambles-per-SSB. Preamble indices for CBRA and CFRA are mapped consecutively for one SSB in one PRACH occasion, as shown in FIG. 1F.

Figure 2:
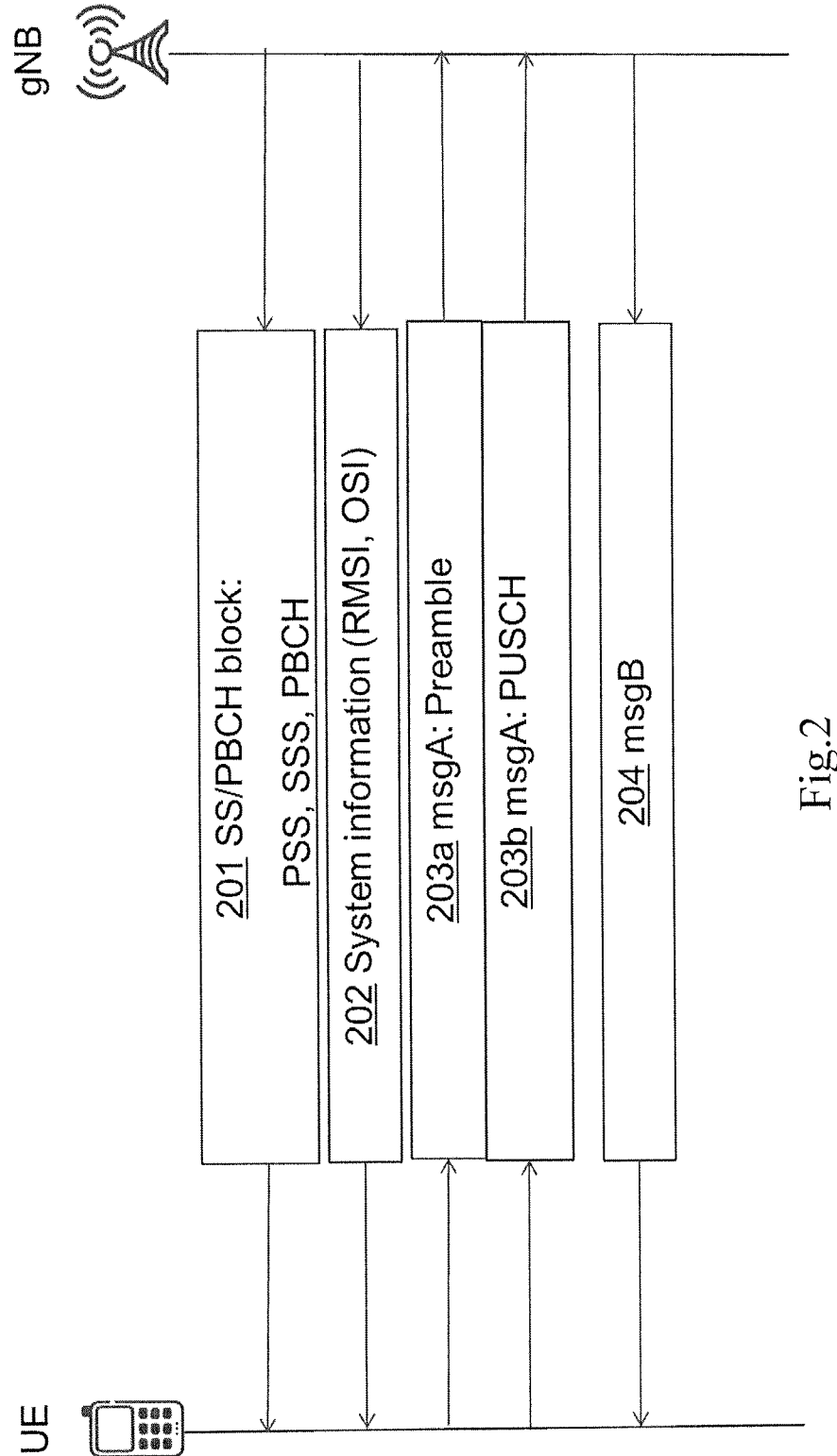
FIG. 2 is a diagram illustrating an exemplary two-step RA procedure according to an embodiment of the present disclosure.

FIG. 2 is a diagram illustrating an exemplary two-step RA procedure according to an embodiment of the present disclosure. Similar to the procedure as shown in FIG. 1A, in the procedure shown in FIG. 2, a UE can detect a SS by receiving 201 an SSB (e.g., comprising a PSS, a SSS and PBCH) from a gNB, and decode 202 system information (e.g., remaining minimum system information (RMSI) and other system information (OSI)) broadcasted in the DL. Compared to the four-step approach as shown in FIG. 1A, the UE performing the procedure in FIG. 2 can complete random access in only two steps. Firstly, the UE sends 203a/203b to the gNB a message A (msgA) including RA preamble together with higher layer data such as a RRC connection request possibly with some payload on PUSCH. Secondly, the gNB sends 204 to the UE a RAR (also called message B or msgB) including UE identifier assignment, timing advance information, a contention resolution message, and etc.

In order to distinguish the legacy UEs performing the four-step RA procedure from the UEs performing the two-step RA procedure, separate PRACH resources (defined by ROs and preamble sequences) can be configured for the two-step RA procedure and the four-step RA procedure. In the two-step RA procedure, the preamble and msgA PUSCH (also called msgA payload) can be transmitted by the UE in one message called message A. The number of preambles (e.g., one or multiple preambles) mapped to one PUSCH resource unit (RU) may be configurable. The PUSCH RU for two-step RA can be defined as the PUSCH occasion (PO)

and at least one of demodulation reference signal (DMRS) port and DMRS sequence usable for the msgA payload transmission.

Some agreement may be made regarding the mapping between a preamble in a RO and a PUSCH RU for two-step RA. For example, the network may have the flexibility to support at least one of the following options:

Option I: one-to-one mapping between a preamble in a RO and a RU in an associated PO;

Option II: one-to-multiple mapping between a preamble in a RO and RUs in an associated PO; and Option III: multiple-to-one mapping between preambles in a RO and a RU in an associated PO.

For four-step RA, the preambles within a single RO may be associated to different SSBs (as shown in FIG. 1E), with each SSB pointing to a different beam direction. For two-step RA, the SSB to preamble and RO mapping may be different for different mapping schemes applied between a RA preamble in a RO and the associated PUSCH RU. Without a careful design of the RA preamble to PUSCH RU mapping, multiple PUSCH transmissions in different transmission (TX) beam directions may be multiplexed in the same PO, or these PUSCH transmissions may be mapped to different POs that are FDMed at the same time instance. Both cases may result in a multi-beam reception issue for PUSCH decoding at the network node, especially when analog beamforming is utilized. In the case of digital beamforming, multiple reception (RX) beams can be used to receive signals at the same time, but when multiple transmissions using the beams with a small beam difference are located on the same occasion, there may be a high collision issue. Therefore, it may be desirable to implement mapping of the SSB associated RA preambles to PUSCH RUs adaptively, according to configuration for the preambles and PUSCH RUs in a RA procedure such as a two-step RA procedure.

In the proposed solution according to some exemplary embodiments, an association between RA resource and shared channel resource for an uplink message (such as message A containing a preamble and PUSCH) in a RA procedure can be determined based at least in part on flexible resource configuration for the RA procedure. In accordance with an exemplary embodiment, the proposed solution may allow a gNB and/or a UE to determine the SSB associated preamble to PUSCH RU mapping for a two-step RA procedure. In accordance with some exemplary embodiments, the association between RA resource and shared channel resource may be adaptive to a configuration of the shared channel resource, which may be variable. For example, the configuration of the shared channel resource may vary so that PUSCH RUs can be configured with different numbers of physical resource blocks (PRBs). In accordance with some exemplary embodiments, when considering the association between ROs and POs, some factors may be considered to be properly ordered for the mapping between RA preambles to PUSCH RUs. Besides, the orthogonality of the preamble sequences (also called "the orthogonality of preambles" for short) and the collision of the PUSCH transmissions in a PO may be also taken into account to improve the detection and decoding performance of the msgA in two-step RA. The proposed solution can enhance the resource utilization and improve the performance of PUSCH transmissions (especially for analogue beamforming) in a RA procedure, while providing the flexibility for the SSB associated preamble to PUSCH RU mapping.

In accordance with some exemplary embodiments, flexible mapping configuration can support a variable number of SSBs and/or the variable PUSCH RU size. The spectral efficiency of msgA PUSCH is expected to be generally substantially less than dynamically scheduled PUSCH (e.g., in four-step RA), since the network normally may not apply link adaptation to msgA PUSCH transmission. Therefore, msgA resource and payload size are conservative, assuming relatively poor channel conditions even when UEs are in good channel conditions. This means that it is desirable to control the number of PUSCH resource units such that they are not over used. A possible way to do this is to have fine granularity in the number of physical resource blocks (PRBs) allocated to POs. For example, the number of POs needs to be set as any non-zero integer up to some limit, such as the number of POs that can fit in an active bandwidth part.

Figure 3A:
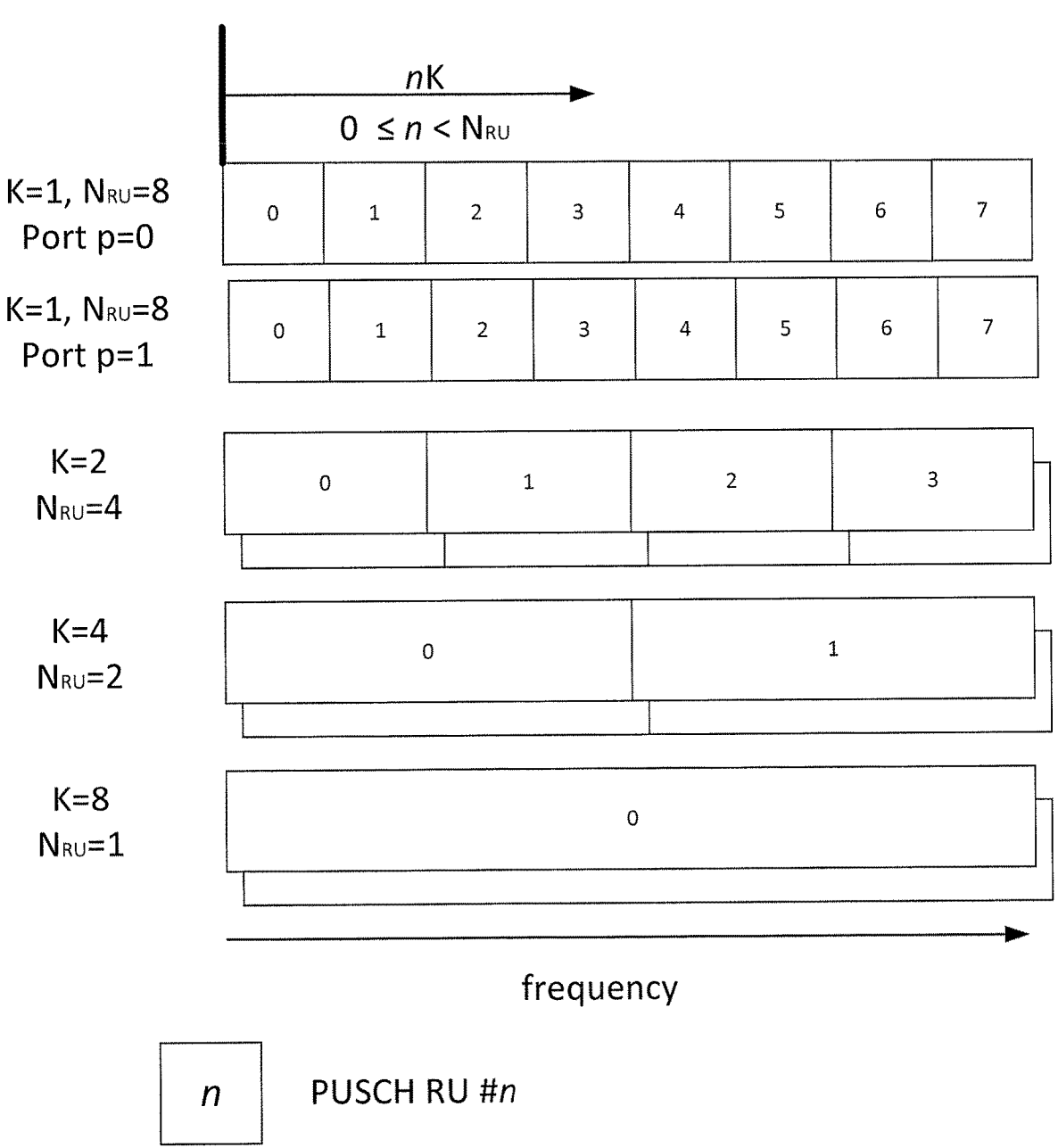
FIG. 3A is a diagram illustrating exemplary configuration for a PUSCH slot according to some embodiments of the present disclosure.

FIG. 3A is a diagram illustrating exemplary configuration for a PUSCH slot according to some embodiments of the present disclosure. The exemplary configuration may allow multi-user multiple-input multiple-output (MU-MIMO) reception. The PUSCH slot (e.g., a "msgA PUSCH slot") may comprise a set of resources containing one or more POs. The PUSCH slot may occur periodically and have a known length in symbols and position in frequency. For the msgA PUSCH slot shown in FIG. 3A, the starting subcarrier is $f_0$ and the starting symbol is $t_0$. As described previously, a PUSCH RU can be defined as a PO with DMRS port and/or DMRS sequence usable for msgA PUSCH transmission. For example, there may be two PUSCH RUs in a PO, each PUSCH RU corresponding to a DMRS port and/or a DMRS sequence. The PUSCH RU may occupy a contiguous set of subcarriers and symbols (e.g., in the case that frequency hopping is not used). As shown in FIG. 3A, a PO (which can be indicated by PUSCH RU index n) may have "K" PRB(s). The parameter K can vary, and a given PRB may correspond to POs with different sizes. Considering an association between a preamble and a PUSCH RU, the parameter K can be identified by which preamble is used. In accordance with some exemplary embodiments, the value of parameter K can be selected by a UE. Alternatively or additionally, the value of parameter K may be indicated in system information from a gNB. Optionally, the UE can randomly select starting PUSCH RU index n.

FIG. 3B is a diagram illustrating exemplary configuration for the preamble to PUSCH RU mapping according to some embodiments of the present disclosure. In the exemplary configuration shown in FIG. 3B, preambles in a set of ROs are mapped to a set of POs in a msgA PUSCH slot. The POs may have different sizes, such as K=4, K=8 and K=16. For the case of K=4, each PO occupies 4 PRBs in frequency and 3 orthogonal frequency division multiplexing (OFDM) symbols. Similarly, for the case of K=8, each PO occupies 8 PRBs in frequency and 3 OFDM symbols, while for the case of K=16, each PO occupies 16 PRBs in frequency and 3 OFDM symbols.

In the example of FIG. 3B, each PO contains two PUSCH RUs, and each of the PUSCH RUs is associated with a distinct DMRS transmission. The distinct DMRS transmission can be a DMRS antenna port, a DMRS with a different sequence initialization (or equivalently a different DMRS scrambling identifier (ID)), or a combination of a DMRS antenna port and a DMRS sequence initialization. Each PUSCH RU can map to a preamble set including one or multiple preambles. In FIG. 3B, PUSCH RUs {DMRS$_0$} and {DMRS$_1$} correspond to PRACH preamble sets {Preamble Set$_0$} and {Preamble Set$_1$}, respectively. For example, PUSCH RUs {0} and {1} in PO {0} correspond to PRACH preambles {0, 8} and {4, 12}, respectively. Multiple POs that are frequency division multiplexed (FDMed)

in a given OFDM symbol set may correspond to a particular SSB. In the example of FIG. 3B, POs occupying symbols 0 to 2 correspond to SSB0, while those occupying symbols 2 to 5 correspond to SSB1, etc. There are 28 preambles associated with the PUSCH RUs corresponding to each SSB.

As shown in FIG. 3B, two-to-one mapping is applied between a preamble in a RO and a PUSCH RU in a PO. In accordance with an exemplary embodiment, the SSB to RO and preamble mapping rule may be defined, for example, to map the preambles in one RO associated with all the PUSCH RUs in one time domain PO to one SSB, so that multiple UEs with the same or similar beam direction can be grouped into one time domain PO indirectly, because the UEs which detect the SSB beam in this direction as the best beam may select the associated preambles for msgA preamble transmission. This exemplary SSB to RO and preamble mapping rule makes it possible for a gNB to receive a group of UEs in their common best direction in one time domain PO, especially when analogue beamforming is used. Here the time domain PO may comprise one or more POs (e.g., 4 POs for K=4, 2 POs for K=8 and 1 PO for K=16, as shown in FIG. 3B) which can be FDMed at one time instance.

It can be appreciated that the configuration for PO size and the SSB associated preamble to PUSCH RU mapping as shown in FIG. 3A or FIG. 3B is just as an example, and other suitable configuration (e.g., one-to-one mapping or one-to-multiple mapping between preambles and PUSCH RUs) can also be implemented according to a proper criterion.

In accordance with an exemplary embodiment, in order to allow the same analog beamformer for SSB, PRACH and msgA PUSCH, each time domain PO may correspond to one SSB, which can be enabled by the following formula:

$$M \cdot N_{DMRS} \cdot \sum_{k=0}^{S-1} N_{PO}(k) = N_{SSB}^{2step} \tag{1}$$

where $$N_{SSB}^{2step}$$

is the number of preambles used for two-step RA in one RO and one SSB, M (M≥1) is the number of preambles mapped to each PUSCH RU, $N_{DMRS}$ is the number of DMRS (or PUSCH RU) for one PO, S is the number of different PO sizes, and $N_{PO}(k)$ is the number of POs multiplexed in one time domain PO with PO size index k.

In accordance with an exemplary embodiment, PUSCH RUs can be identified or numbered with a specific order considering one or more factors, such as DMRS antenna ports and/or scrambling, POs being FDMed, POs being time-division multiplexed (TDMed), POs for each PO size. For example, the specific order for numbering PUSCH RUs as shown in FIG. 3B may be provided firstly by DMRS antenna ports and/or scrambling, secondly by frequency, thirdly by PO size, and then by time.

In accordance with an exemplary embodiment, the preambles from a RO can be mapped to PUSCH RUs sequentially M at a time, considering at least one of the following factors:

the possibility of preambles with different cyclic shifts or different root sequences on the same PO and/or on the POs with correlation higher than a predefined correlation threshold (for this case, it can be understood that the preambles with different cyclic shifts are orthogonal, while the preambles with different root sequences are not orthogonal);

the possibility of PUSCH transmission colliding in one PUSCH occasion (e.g., for the case that the number of preambles is not too large, the preambles with consecutive preamble IDs can be mapped on different POs);

the frequency of PUSCH RUs;

antenna ports and/or DMRS scrambling of PUSCH RUs;

the number of preambles mapped to one PUSCH RU;

the PUSCH RU (and PO) time/frequency size (e.g., the possibility that multiple PUSCH RU sizes need to be able to correspond to an SSB, which is good for UEs to select different sizes depending on the link quality and the size of the payload to be transmitted);

the time of PUSCH RUs (e.g., different SSBs can be associated to different PUSCH symbol sets).

According to an embodiment, an exemplary mapping of preambles to PUSCH RUs can be illustrated as below:

Step A: Map preambles to PUSCH RUs by considering the frequency of the PUSCH RUs (e.g., the mapping may be based at least in part on cyclic shifts of the preambles, which can be orthogonal);

Step B: Map preambles to PUSCH RUs by considering antenna ports and/or DMRS scrambling of the PUSCH RUs (e.g., the mapping may be based at least in part on the root index for the preambles, which may not be orthogonal);

Step C: If M preambles are not mapped to each PUSCH RU, then go to Step A and repeat Steps A-C;

Step D: Map preambles to PUSCH RUs by considering the PUSCH RU (and PO) time/frequency size (e.g., the mapping may be based at least in part on different PO sizes so as to enable PUSCH RUs in POs with multiple sizes to be able to correspond to an SSB); and Step E: Map preambles to PUSCH RUs by considering the OFDM symbol(s) containing the PUSCH (e.g., different SSBs can be mapped to different PUSCH symbols).

As an example, the exemplary mapping of RA preambles to PUSCH RUs can be implemented according to the following formula:

$$n_{RA} = n_{PO,f} + (n_{DMRS} + m' \cdot N_{DMRS}) \cdot N_{po}(k) + \tag{2}$$

$$M \cdot N_{DMRS} \cdot \sum_{k'=0}^{k-1} N_{P0}(k') + n_{PO,t} \cdot N_{SSB}^{RO} + N_{\Delta}$$

where $n_{RA}$ is the index of the RA preamble;

k is the index of the size of the PO;

$n_{PO,f}$ and $n_{PO,t}$ are the indices of the POs in frequency and time, and in some embodiments may be defined as $$n_{PO,t} = \text{floor}\left(n / \sum_{k'=0}^{S-1} N_{PO}(k')\right)$$

and $$n_{PO,f} = n \ \text{mod}\left(\sum_{k'=0}^{S-1} N_{PO}(k')\right),$$

17 respectively, where n is an index of a PO and $$0 \leq n < N \cdot \sum_{k=0}^{S-1} N_{PO}(k),$$

S is the number of different PO sizes, and N is the number of SSBs per RO;

$n_{DMRS}$ is the index of the DMRS port and/or scrambling;

$0 \leq m' < M$ allows multiple preambles to be mapped to a PUSCH RU;

$M(M \geq 1)$ is the number of preambles mapped to each PUSCH RU;

$N_{DMRS}$ is the total number of DMRS ports and/or DMRS initializations (also called "scrambling IDs");

$N_{PO}(k)$ is the number of POs multiplexed in one time domain PO with PO size index k;

$$0 \leq N_{\Delta} < N_{SSB}^{RO}$$

is an offset allowing preambles used for two-step RA to follow four-step RA preambles in a RO for an SSB;

$$N_{SSB}^{RO}$$

is the number of preambles mapped to one SSB in one RO, for example, $$N_{SSB}^{RO} = N_{preamble}^{total} / N$$

for the case of $N \geq 1$, and $$N_{SSB}^{RO} = N_{preamble}^{total}$$

for the case of $N < 1$, and where $$N_{preamble}^{total}$$

is the total number of preambles in a RO.

In accordance with some exemplary embodiments, the number of PRACH preambles can be much larger than the number of POs since preambles use relatively little time-frequency resource compared to PUSCH. Therefore, there can be more PRACH preambles in a RO than there are PUSCH RUs that correspond to the RO. This can be seen in the exemplary RO to PO mapping shown in FIG. 3B.

In the example of FIG. 3B, preambles in a first RO are mapped to SSB0 and SSB1, while those in a second RO are mapped to SSB2 and SSB3. Since there are 14 PUSCH RUs per SSB, and 2 PRACH preambles are mapped to each PUSCH RU, 28 preambles are needed for each SSB. Therefore, only 56 out of 64 preambles in a RO are needed to support the msgA PUSCH slot in this example. It can be observed that an integer number of preambles cannot be mapped to the 14 PUSCH RUs such that there are 64 preambles. Therefore, a proper mechanism may be applied to map a subset of preambles in a RO to PUSCH RUs.

In accordance with some exemplary embodiments, at one time instance, the POs for one size can overlap with the POs for another size, or these POs with different sizes can be separated in frequency domain.

It will be realized that parameters, variables and settings related to the signaling transmission and resource allocation described herein are just examples. Other suitable message settings, the associated configuration parameters and the specific values thereof may also be applicable to implement the proposed methods.

It is noted that some embodiments of the present disclosure are mainly described in relation to 5G or NR specifications being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies may equally be utilized as long as exemplary embodiments described herein are applicable.

Figure 4:
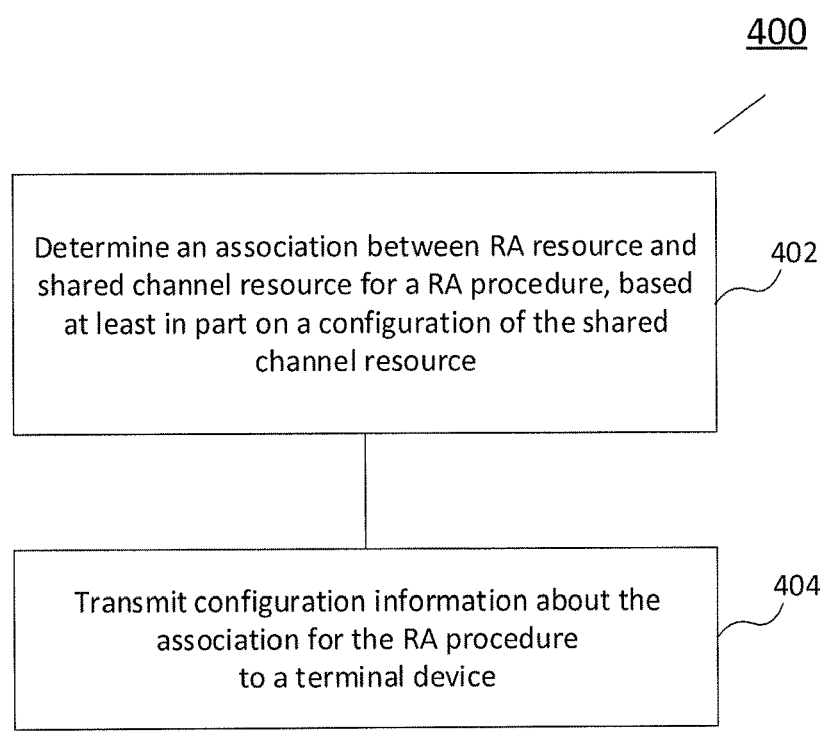
FIG. 4 is a flowchart illustrating a method according to some embodiments of the present disclosure.

FIG. 4 is a flowchart illustrating a method 400 according to some embodiments of the present disclosure. The method 400 illustrated in FIG. 4 may be performed by a network node or an apparatus communicatively coupled to the network node. In accordance with an exemplary embodiment, the network node may comprise a base station such as gNB. The network node can be configured to communicate with one or more terminal devices such as UEs which may be able to support one or more RA approaches such as two-step RA and/or four-step RA.

According to the exemplary method 400 illustrated in FIG. 4, the network node can determine an association between RA resource and shared channel resource for a RA procedure, based at least in part on a configuration of the shared channel resource, as shown in block 402. The configuration of the shared channel resource may be variable. In accordance with some exemplary embodiments, the RA procedure may be a two-step RA procedure. The RA resource and the shared channel resource can be used for a UL message (such as message A including a RA preamble and PUSCH) in the RA procedure. The network node can transmit configuration information about the association for the RA procedure to a terminal device, as shown in block 404. For example, the configuration information may be carried in a broadcast information block (such as SIB1) transmitted to the terminal device from the network node. Optionally, the terminal device may implement accessing to the network node according to the association between the RA resource and the shared channel resource.

Figure 5:
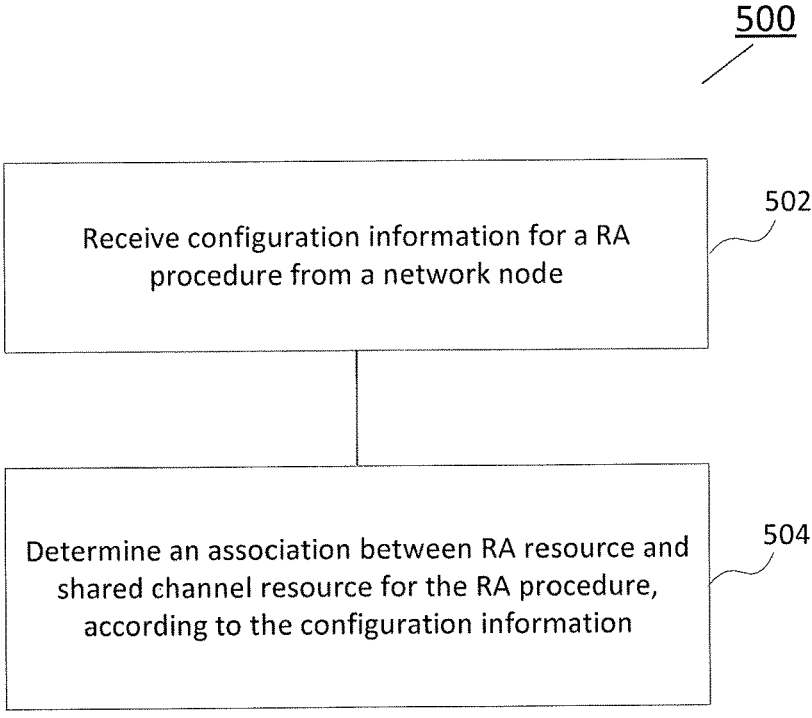
FIG. 5 is a flowchart illustrating another method according to some embodiments of the present disclosure.

FIG. 5 is a flowchart illustrating a method 500 according to some embodiments of the present disclosure. The method 500 illustrated in FIG. 5 may be performed by a terminal device or an apparatus communicatively coupled to the terminal device. In accordance with an exemplary embodiment, the terminal device such as a UE can be configured to communicate with a network node such as gNB by supporting one or more RA approaches such as two-step RA and/or four-step RA.

According to the exemplary method 500 illustrated in FIG. 5, the terminal device may receive configuration information for a RA procedure (e.g., a two-step RA procedure) from a network node (such as the network node described with respect to FIG. 4), as shown in block 502. According to the configuration information, the terminal device can determine an association between RA resource and shared channel resource for the RA procedure, as shown in block 504. The association may be based at least in part on a configuration of the shared channel resource. The configuration of the shared channel resource may be variable. Optionally, the terminal device may perform the RA procedure, according to the determination of the association between the RA resource and the shared channel resource.

In accordance with some exemplary embodiments, the configuration of the shared channel resource may comprise: configuration of shared channel occasions (such as PUSCH occasions) with one or more sizes by enabling the shared channel occasions to be configured with a variable number of PRBs (e.g., different values of parameter K as described with respect to FIG. 3B). Optionally, the configuration of the shared channel resource may be provisioned by at least one of the terminal device and the network node.

In accordance with some exemplary embodiments, the association between the RA resource and the shared channel resource may comprise: mapping of a preamble in a RA occasion (such as a PRACH occasion) to a RU in a shared channel occasion (such as a PUSCH occasion). Optionally, time resource (such as OFDM symbol for PUSCH) configured for the RU can correspond to an SSB associated with the preamble (e.g., each time domain PO can correspond to one SSB).

In accordance with some exemplary embodiments, the SSB may be associated with one or more preambles, and the one or more preambles may be mapped to one or more shared channel occasions which have at least one size and are configured with the same time resource. In this case, an SSB may be mapped to multiple FDMed POs with same size, and/or multiple POs with different sizes.

In accordance with some exemplary embodiments, the RU in the shared channel occasion may be identified according to an identification rule. For example, the identification rule may be based at least in part on one or more of the following identification factors (which may optionally have different priorities):

a DMRS identifier configured for the RU (e.g., the DMRS identifier can identify at least one of a DMRS antenna port and a DMRS sequence initialization);

a location of the shared channel occasion in frequency domain (e.g., the frequency position of the shared channel occasion);

a location of the shared channel occasion in time domain (e.g., the time position of the shared channel occasion); and a size of the shared channel occasion, which can identify the number of one or more PRBs and the number of one or more symbols (such as OFDM symbols) occupied by the shared channel occasion.

In accordance with some exemplary embodiments, mapping of the preamble in the RA occasion to the RU in the shared channel occasion may be performed according to a mapping rule. In an embodiment, the mapping rule may comprise: mapping, in a predetermined order based at least in part on the identification factors, identifiers of preambles in increasing order to identifiers of RUs. The predetermined order may indicate that among the identification factors, the location of the shared channel occasion in time domain has a lowest priority in the mapping of the identifiers. For example, the preambles can be identified with integer indices, and the indices in increasing order can be mapped to the identification factors of the RUs in a predetermined order, comprising first mapping to identification factors other than the location of the shared channel occasion in time domain, and then mapping to the location of the shared channel occasion in the time domain.

In accordance with some exemplary embodiments, the predetermined order may further indicate that compared with the DMRS identifier and the location of the shared channel occasion in frequency domain, the size of the shared channel occasion has a lower priority in the mapping of the identifiers. For example, the indices of the preambles can be mapped to the size of the shared channel occasion after being mapped to the DMRS identifier and the location of the shared channel occasion in frequency domain.

In accordance with some exemplary embodiments, the predetermined order may further indicate that among the identification factors, the DMRS identifier has a highest priority in the mapping of the identifiers. For example, the indices of the preambles can be mapped to the DMRS identifier prior to being mapped to the location of the shared channel occasion in frequency domain.

In accordance with some exemplary embodiments, the mapping of the preamble in the RA occasion to the RU in the shared channel occasion may be implemented according to a mapping rule. For example, the mapping rule may be based at least in part on one or more of the following mapping factors (which may optionally have different priorities):

orthogonality of preambles (which may be related to cyclic shifts and root sequences of the preambles);

a probability of transmission colliding on the shared channel occasion;

frequency resource configured for the RU;

a DMRS port configured for the RU;

a DMRS sequence initialization configured for the RU;

a number of preambles mapped to the RU;

a size of the shared channel occasion; and time resource configured for the RU.

In accordance with some exemplary embodiments, the mapping rule may comprise: mapping preambles having orthogonality above a first orthogonality threshold to one or more shared channel occasions configured with time-frequency resource having correlation above a predefined correlation threshold.

In accordance with some exemplary embodiments, the mapping rule may comprise: mapping preambles having orthogonality below a second orthogonality threshold to different DMRS ports. Alternatively or additionally, the mapping rule may comprise: mapping preambles having orthogonality below a third orthogonality threshold to different DMRS sequences.

In accordance with some exemplary embodiments, the mapping rule may comprise: mapping preambles having consecutive IDs to different shared channel occasions.

In accordance with some exemplary embodiments, the mapping rule may comprise: mapping preambles associated with the SSB to multiple shared channel occasions with different sizes.

In accordance with some exemplary embodiments, the shared channel occasion associated with the SSB may be configured with time resource (e.g., one or more OFDM symbols) different from another shared channel occasion associated with a different SSB.

The proposed solution according to one or more exemplary embodiments can enable the SSB to RO and msgA preamble and PO mapping in a RA procedure such as a two-step RA procedure. In some exemplary embodiments, RA preambles can be adaptively mapped to PUSCH RUs in two-step RA, for example, by taking into account one or more factors such as the ordering of PUSCH RU, the ordering of preamble and the PO size, the orthogonality of the preamble sequences, the collision probability between POs, etc. Various rules and parameters may be used to support variable configuration of the PO size and application of beamforming in the two-step RA procedure, so as to improve flexibility of transmission configuration and performance of signaling processing, and enhance resource utilization.

The various blocks shown in FIGS. 4-5 may be viewed as method steps, and/or as operations that result from operation of computer program code, and/or as a plurality of coupled logic circuit elements constructed to carry out the associated function(s). The schematic flow chart diagrams described above are generally set forth as logical flow chart diagrams. As such, the depicted order and labeled steps are indicative of specific embodiments of the presented methods. Other steps and methods may be conceived that are equivalent in function, logic, or effect to one or more steps, or portions thereof, of the illustrated methods. Additionally, the order in which a particular method occurs may or may not strictly adhere to the order of the corresponding steps shown.

Figure 6:
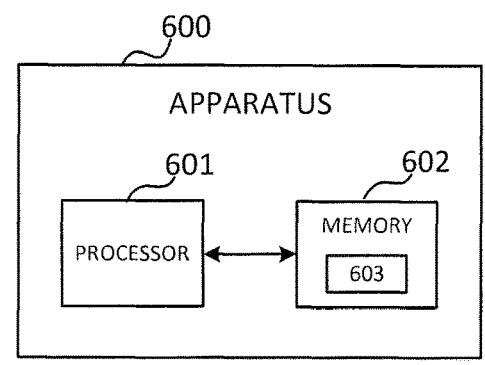
FIG. 6 is a block diagram illustrating an apparatus according to some embodiments of the present disclosure.

FIG. 6 is a block diagram illustrating an apparatus 600 according to various embodiments of the present disclosure. As shown in FIG. 6, the apparatus 600 may comprise one or more processors such as processor 601 and one or more memories such as memory 602 storing computer program codes 603. The memory 602 may be non-transitory machine/processor/computer readable storage medium. In accordance with some exemplary embodiments, the apparatus 600 may be implemented as an integrated circuit chip or module that can be plugged or installed into a network node as described with respect to FIG. 4, or a terminal device as described with respect to FIG. 5. In such case, the apparatus 600 may be implemented as a network node as described with respect to FIG. 4, or a terminal device as described with respect to FIG. 5.

In some implementations, the one or more memories 602 and the computer program codes 603 may be configured to, with the one or more processors 601, cause the apparatus 600 at least to perform any operation of the method as described in connection with FIG. 4. In other implementations, the one or more memories 602 and the computer program codes 603 may be configured to, with the one or more processors 601, cause the apparatus 600 at least to perform any operation of the method as described in connection with FIG. 5. Alternatively or additionally, the one or more memories 602 and the computer program codes 603 may be configured to, with the one or more processors 601, cause the apparatus 600 at least to perform more or less operations to implement the proposed methods according to the exemplary embodiments of the present disclosure.

Figure 7:
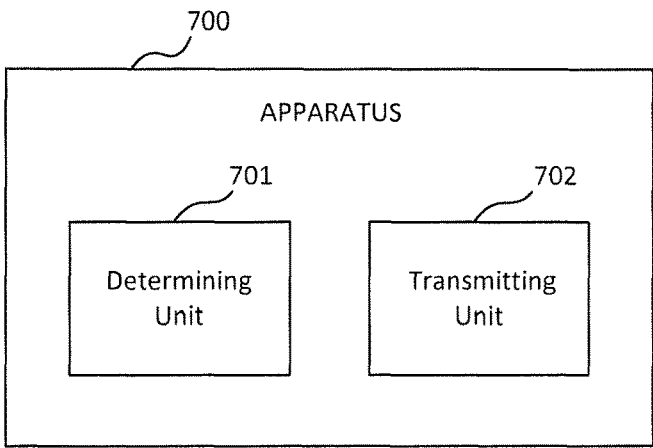
FIG. 7 is a block diagram illustrating another apparatus according to some embodiments of the present disclosure.

FIG. 7 is a block diagram illustrating an apparatus 700 according to some embodiments of the present disclosure. As shown in FIG. 7, the apparatus 700 may comprise a determining unit 701 and a transmitting unit 702. In an exemplary embodiment, the apparatus 700 may be implemented in a network node such as a gNB. The determining unit 701 may be operable to carry out the operation in block 402, and the transmitting unit 702 may be operable to carry out the operation in block 404. Optionally, the determining unit 701 and/or the transmitting unit 702 may be operable to carry out more or less operations to implement the proposed methods according to the exemplary embodiments of the present disclosure.

Figure 8:
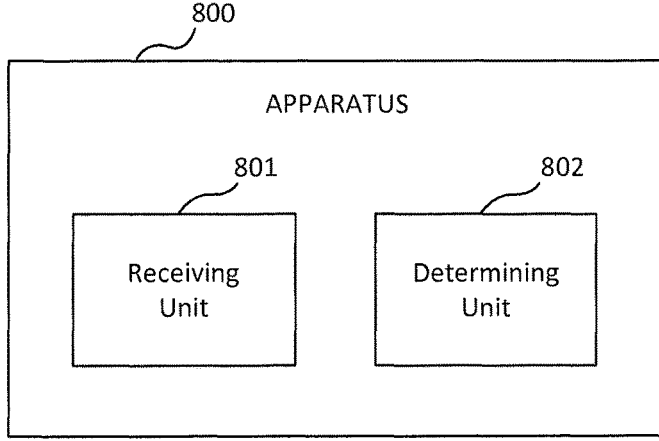
FIG. 8 is a block diagram illustrating yet another apparatus according to some embodiments of the present disclosure.

FIG. 8 is a block diagram illustrating an apparatus 800 according to some embodiments of the present disclosure. As shown in FIG. 8, the apparatus 800 may comprise a receiving unit 801 and a determining unit 802. In an exemplary embodiment, the apparatus 800 may be implemented in a terminal device such as a UE. The receiving unit 801 may be operable to carry out the operation in block 502, and the determining unit 802 may be operable to carry out the operation in block 504. Optionally, the receiving unit 801 and/or the determining unit 802 may be operable to carry out more or less operations to implement the proposed methods according to the exemplary embodiments of the present disclosure.

Figure 9:
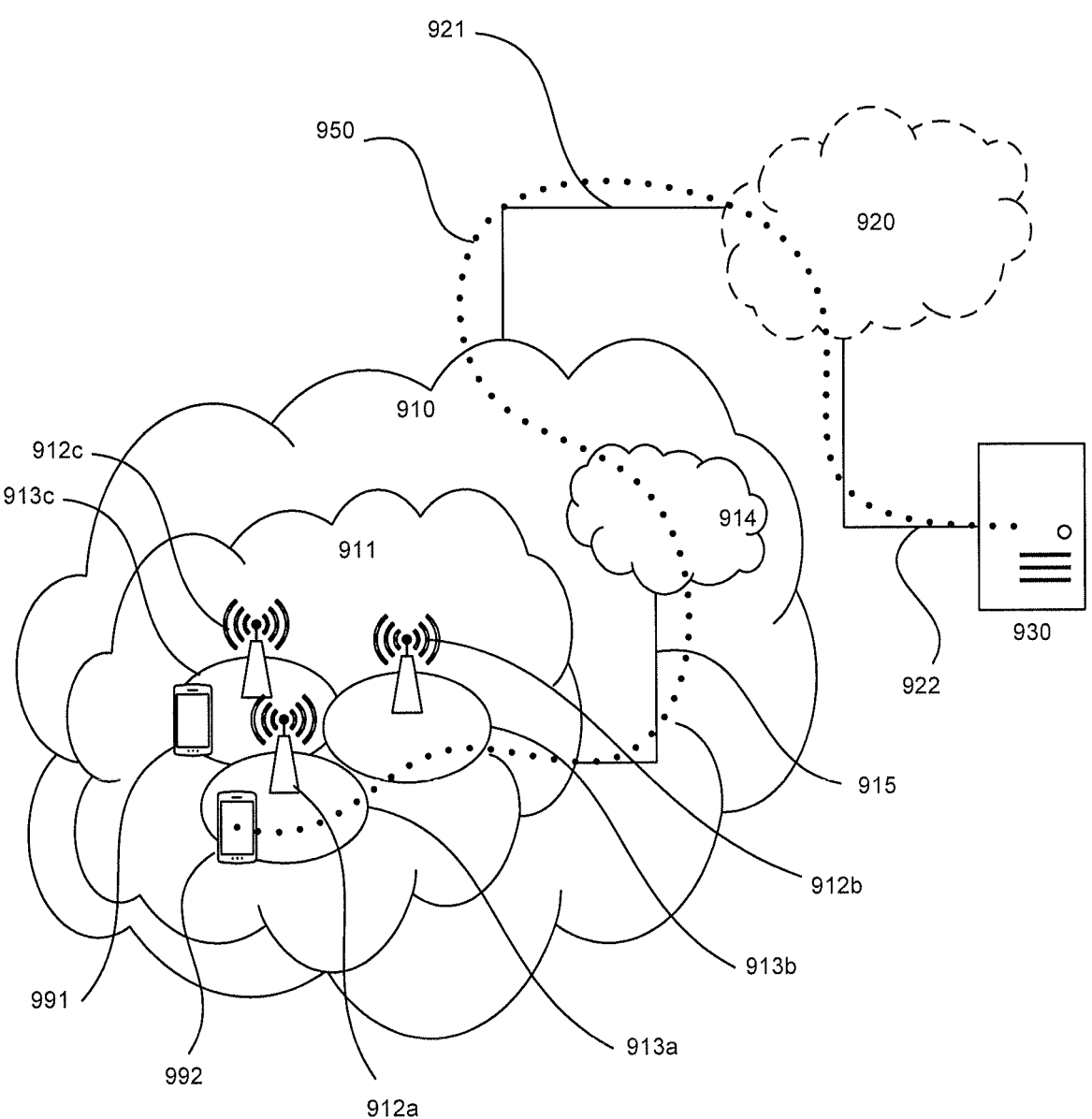
FIG. 9 is a block diagram illustrating a telecommunication network connected via an intermediate network to a host computer in accordance with some embodiments of the present disclosure.

FIG. 9 is a block diagram illustrating a telecommunication network connected via an intermediate network to a host computer in accordance with some embodiments of the present disclosure.

With reference to FIG. 9, in accordance with an embodiment, a communication system includes a telecommunication network 910, such as a 3GPP-type cellular network, which comprises an access network 911, such as a radio access network, and a core network 914. The access network 911 comprises a plurality of base stations 912a, 912b, 912c, such as NBs, eNBs, gNBs or other types of wireless access points, each defining a corresponding coverage area 913a, 913b, 913c. Each base station 912a, 912b, 912c is connectable to the core network 914 over a wired or wireless connection 915. A first UE 991 located in a coverage area 913c is configured to wirelessly connect to, or be paged by, the corresponding base station 912c. A second UE 992 in a coverage area 913a is wirelessly connectable to the corresponding base station 912a. While a plurality of UEs 991, 992 are illustrated in this example, the disclosed embodiments are equally applicable to a situation where a sole UE is in the coverage area or where a sole UE is connecting to the corresponding base station 912.

The telecommunication network 910 is itself connected to a host computer 930, which may be embodied in the hardware and/or software of a standalone server, a cloud-implemented server, a distributed server or as processing resources in a server farm. The host computer 930 may be under the ownership or control of a service provider, or may be operated by the service provider or on behalf of the service provider. Connections 921 and 922 between the telecommunication network 910 and the host computer 930 may extend directly from the core network 914 to the host computer 930 or may go via an optional intermediate network 920. An intermediate network 920 may be one of, or a combination of more than one of, a public, private or hosted network; the intermediate network 920, if any, may be a backbone network or the Internet; in particular, the intermediate network 920 may comprise two or more sub-networks (not shown).

The communication system of FIG. 9 as a whole enables connectivity between the connected UEs 991, 992 and the host computer 930. The connectivity may be described as an over-the-top (OTT) connection 950. The host computer 930 and the connected UEs 991, 992 are configured to communicate data and/or signaling via the OTT connection 950, using the access network 911, the core network 914, any intermediate network 920 and possible further infrastructure (not shown) as intermediaries. The OTT connection 950 may be transparent in the sense that the participating communication devices through which the OTT connection 950 passes are unaware of routing of uplink and downlink communications. For example, the base station 912 may not or need not be informed about the past routing of an incoming downlink communication with data originating from the host computer 930 to be forwarded (e.g., handed over) to a connected UE 991. Similarly, the base station 912 need not be aware of the future routing of an outgoing uplink communication originating from the UE 991 towards the host computer 930.

Figure 10:
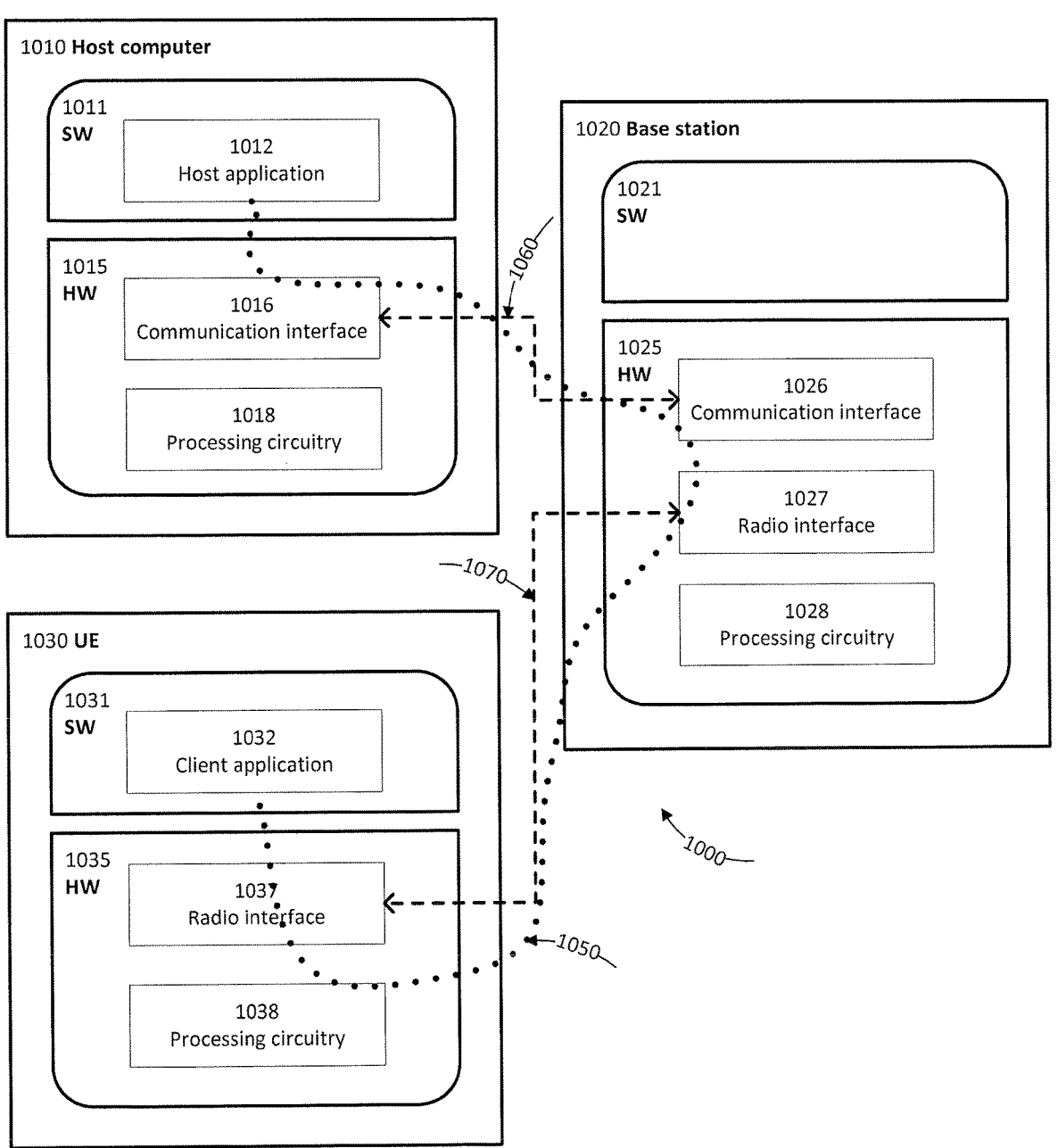
FIG. 10 is a block diagram illustrating a host computer communicating via a base station with a UE over a partially wireless connection in accordance with some embodiments of the present disclosure.

FIG. 10 is a block diagram illustrating a host computer communicating via a base station with a UE over a partially wireless connection in accordance with some embodiments of the present disclosure.

Example implementations, in accordance with an embodiment, of the UE, base station and host computer discussed in the preceding paragraphs will now be described with reference to FIG. 10. In a communication system 1000, a host computer 1010 comprises hardware 1015 including a communication interface 1016 configured to set up and maintain a wired or wireless connection with an interface of a different communication device of the communication system 1000. The host computer 1010 further comprises a processing circuitry 1018, which may have storage and/or processing capabilities. In particular, the processing circuitry 1018 may comprise one or more programmable processors, application-specific integrated circuits, field programmable gate arrays or combinations of these (not shown) adapted to execute instructions. The host computer 1010 further comprises software 1011, which is stored in or accessible by the host computer 1010 and executable by the processing circuitry 1018. The software 1011 includes a host application 1012. The host application 1012 may be operable to provide a service to a remote user, such as UE 1030 connecting via an OTT connection 1050 terminating at the UE 1030 and the host computer 1010. In providing the service to the remote user, the host application 1012 may provide user data which is transmitted using the OTT connection 1050.

The communication system 1000 further includes a base station 1020 provided in a telecommunication system and comprising hardware 1025 enabling it to communicate with the host computer 1010 and with the UE 1030. The hardware 1025 may include a communication interface 1026 for setting up and maintaining a wired or wireless connection with an interface of a different communication device of the communication system 1000, as well as a radio interface 1027 for setting up and maintaining at least a wireless connection 1070 with the UE 1030 located in a coverage area (not shown in FIG. 10) served by the base station 1020. The communication interface 1026 may be configured to facilitate a connection 1060 to the host computer 1010. The connection 1060 may be direct or it may pass through a core network (not shown in FIG. 10) of the telecommunication system and/or through one or more intermediate networks outside the telecommunication system. In the embodiment shown, the hardware 1025 of the base station 1020 further includes a processing circuitry 1028, which may comprise one or more programmable processors, application-specific integrated circuits, field programmable gate arrays or combinations of these (not shown) adapted to execute instructions. The base station 1020 further has software 1021 stored internally or accessible via an external connection.

The communication system 1000 further includes the UE 1030 already referred to. Its hardware 1035 may include a radio interface 1037 configured to set up and maintain a wireless connection 1070 with a base station serving a coverage area in which the UE 1030 is currently located. The hardware 1035 of the UE 1030 further includes a processing circuitry 1038, which may comprise one or more programmable processors, application-specific integrated circuits, field programmable gate arrays or combinations of these (not shown) adapted to execute instructions. The UE 1030 further comprises software 1031, which is stored in or accessible by the UE 1030 and executable by the processing circuitry 1038. The software 1031 includes a client application 1032. The client application 1032 may be operable to provide a service to a human or non-human user via the UE 1030, with the support of the host computer 1010. In the host computer 1010, an executing host application 1012 may communicate with the executing client application 1032 via the OTT connection 1050 terminating at the UE 1030 and the host computer 1010. In providing the service to the user, the client application 1032 may receive request data from the host application 1012 and provide user data in response to the request data. The OTT connection 1050 may transfer both the request data and the user data. The client application 1032 may interact with the user to generate the user data that it provides.

It is noted that the host computer 1010, the base station 1020 and the UE 1030 illustrated in FIG. 10 may be similar or identical to the host computer 930, one of base stations 912*a*, 912*b*, 912*c* and one of UEs 991, 992 of FIG. 9, respectively. This is to say, the inner workings of these entities may be as shown in FIG. 10 and independently, the surrounding network topology may be that of FIG. 9.

In FIG. 10, the OTT connection 1050 has been drawn abstractly to illustrate the communication between the host computer 1010 and the UE 1030 via the base station 1020, without explicit reference to any intermediary devices and the precise routing of messages via these devices. Network infrastructure may determine the routing, which it may be configured to hide from the UE 1030 or from the service provider operating the host computer 1010, or both. While the OTT connection 1050 is active, the network infrastructure may further take decisions by which it dynamically changes the routing (e.g., on the basis of load balancing consideration or reconfiguration of the network).

Wireless connection 1070 between the UE 1030 and the base station 1020 is in accordance with the teachings of the embodiments described throughout this disclosure. One or more of the various embodiments improve the performance of OTT services provided to the UE 1030 using the OTT connection 1050, in which the wireless connection 1070 forms the last segment. More precisely, the teachings of these embodiments may improve the latency and the power consumption, and thereby provide benefits such as lower complexity, reduced time required to access a cell, better responsiveness, extended battery lifetime, etc.

A measurement procedure may be provided for the purpose of monitoring data rate, latency and other factors on which the one or more embodiments improve. There may further be an optional network functionality for reconfiguring the OTT connection 1050 between the host computer 1010 and the UE 1030, in response to variations in the measurement results. The measurement procedure and/or the network functionality for reconfiguring the OTT connection 1050 may be implemented in software 1011 and hardware 1015 of the host computer 1010 or in software 1031 and hardware 1035 of the UE 1030, or both. In embodiments, sensors (not shown) may be deployed in or in association with communication devices through which the OTT connection 1050 passes; the sensors may participate in the measurement procedure by supplying values of the monitored quantities exemplified above, or supplying values of other physical quantities from which the software 1011, 1031 may compute or estimate the monitored quantities. The reconfiguring of the OTT connection 1050 may include message format, retransmission settings, preferred routing etc.; the reconfiguring need not affect the base station 1020, and it may be unknown or imperceptible to the base station 1020. Such procedures and functionalities may be known and practiced in the art. In certain embodiments, measurements may involve proprietary UE signaling facilitating the host computer 1010's measurements of throughput, propagation times, latency and the like. The measurements may be implemented in that the software 1011 and 1031 causes messages to be transmitted, in particular empty or 'dummy' messages, using the OTT connection 1050 while it monitors propagation times, errors etc.

Figure 11:
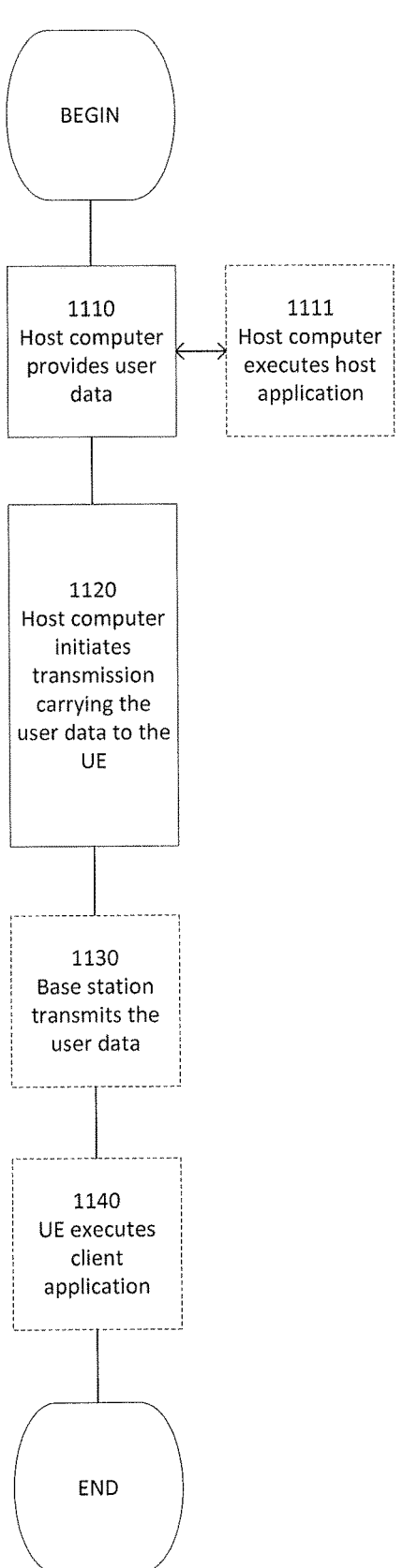
FIG. 11 is a flowchart illustrating a method implemented in a communication system, in accordance with an embodiment of the present disclosure.

FIG. 11 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 11 will be included in this section. In step 1110, the host computer provides user data. In substep 1111 (which may be optional) of step 1110, the host computer provides the user data by executing a host application. In step 1120, the host computer initiates a transmission carrying the user data to the UE. In step 1130 (which may be optional), the base station transmits to the UE the user data which was carried in the transmission that the host computer initiated, in accordance with the teachings of the embodiments described throughout this disclosure. In step 1140 (which may also be optional), the UE executes a client application associated with the host application executed by the host computer.

Figure 12:
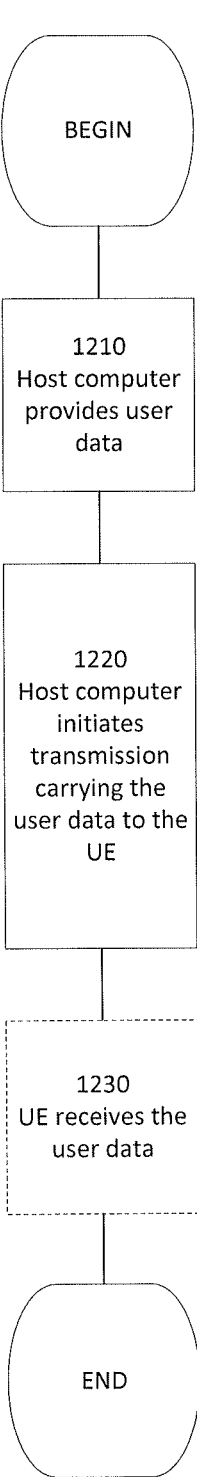
FIG. 12 is a flowchart illustrating a method implemented in a communication system, in accordance with an embodiment of the present disclosure.

FIG. 12 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 12 will be included in this section. In step 1210 of the method, the host computer provides user data. In an optional substep (not shown) the host computer provides the user data by executing a host application. In step 1220, the host computer initiates a transmission carrying the user data to the UE. The transmission may pass via the base station, in accordance with the teachings of the embodiments described throughout this disclosure. In step 1230 (which may be optional), the UE receives the user data carried in the transmission.

Figure 13:
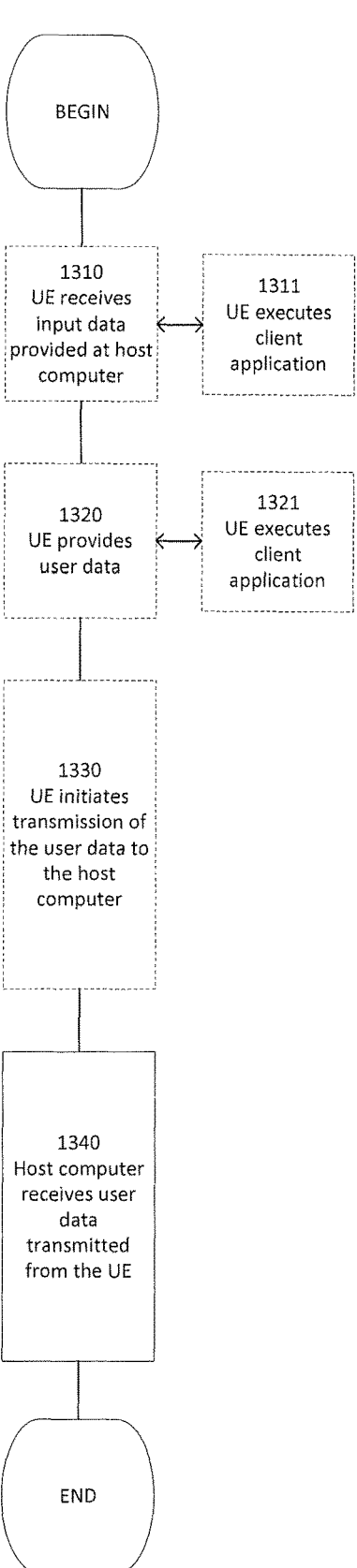
FIG. 13 is a flowchart illustrating a method implemented in a communication system, in accordance with an embodiment of the present disclosure.

FIG. 13 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 13 will be included in this section. In step 1310 (which may be optional), the UE receives input data provided by the host computer. Additionally or alternatively, in step 1320, the UE provides user data. In substep 1321 (which may be optional) of step 1320, the UE provides the user data by executing a client application. In substep 1311 (which may be optional) of step 1310, the UE executes a client application which provides the user data in reaction to the received input data provided by the host computer. In providing the user data, the executed client application may further consider user input received from the user. Regardless of the specific manner in which the user data was provided, the UE initiates, in substep 1330 (which may be optional), transmission of the user data to the host computer. In step 1340 of the method, the host computer receives the user data transmitted from the UE, in accordance with the teachings of the embodiments described throughout this disclosure.

Figure 14:
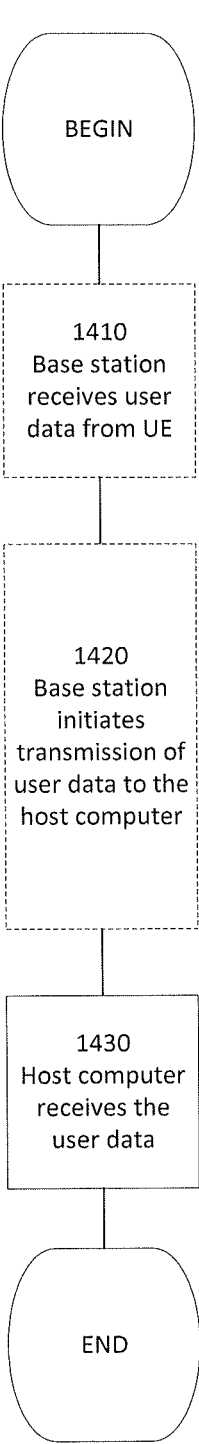
FIG. 14 is a flowchart illustrating a method implemented in a communication system, in accordance with an embodiment of the present disclosure.

FIG. 14 is a flowchart illustrating a method implemented in a communication system, in accordance with an embodiment. The communication system includes a host computer, a base station and a UE which may be those described with reference to FIG. 9 and FIG. 10. For simplicity of the present disclosure, only drawing references to FIG. 14 will be included in this section. In step 1410 (which may be optional), in accordance with the teachings of the embodiments described throughout this disclosure, the base station receives user data from the UE. In step 1420 (which may be optional), the base station initiates transmission of the received user data to the host computer. In step 1430 (which may be optional), the host computer receives the user data carried in the transmission initiated by the base station.

In general, the various exemplary embodiments may be implemented in hardware or special purpose chips, circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, random access memory (RAM), etc. As will be appreciated by one of skill in the art, the function of the program modules may be combined or distributed as desired in various embodiments. In addition, the function may be embodied in whole or partly in firmware or hardware equivalents such as integrated circuits, field programmable gate arrays (FPGA), and the like.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

What is claimed is:

1. A method performed by a terminal device, comprising:

receiving configuration information for a random access procedure from a network node; and determining an association between a random access resource and a shared channel resource for the random access procedure, according to the configuration information, wherein the association is based at least in part on a configuration of the shared channel resource, wherein the association maps a preamble in a random access occasion to a resource unit in a shared channel occasion, wherein a time resource configured for the resource unit corresponds to a synchronization signal and physical broadcast channel block associated with the preamble, wherein mapping of the preamble in the random access occasion to the resource unit in the shared channel occasion is according to a mapping rule, wherein the mapping rule comprises mapping preambles having consecutive identifiers to different shared channel occasions, and wherein the mapping rule is based on a demodulation reference signal port configured for the resource unit and a demodulation reference signal sequence initialization configured for the resource unit.

2. The method according to claim 1, wherein the configuration of the shared channel resource comprises:

configuration of shared channel occasions with one or more sizes by enabling the shared channel occasions to be configured with a variable number of physical resource blocks.

3. The method according to claim 1, wherein the mapping rule is further based on one or more following mapping factors:

orthogonality of preambles;

a probability of transmission colliding on the shared channel occasion;

a size of the shared channel occasion; and time resource configured for the resource unit.

4. The method according to claim 3, wherein the mapping factors have different priorities.

5. The method according to claim 3, wherein the mapping rule comprises:

mapping preambles having consecutive identifiers to different shared channel occasions.

6. The method according to claim 1, wherein the mapping rule comprises:

mapping preambles associated with the synchronization signal and physical broadcast channel block to multiple shared channel occasions with different sizes.

7. The method according to claim 1, wherein the shared channel occasion associated with the synchronization signal and physical broadcast channel block is configured with a time resource different from another shared channel occasion associated with a different synchronization signal and physical broadcast channel block.

8. The method according to claim 1, further comprising:

performing the random access procedure, according to the determining of the association between the random access resource and the shared channel resource.

9. The method according to claim 1, wherein the random access procedure is a two-step random access procedure.

10. A method performed by a network node, comprising:

determining an association between a random access resource and a shared channel resource for a random access procedure, wherein the association is based at least in part on a configuration of the shared channel resource, wherein the association is based on a mapping of a preamble in a random access occasion to a resource unit in a shared channel occasion, wherein a time resource configured for the resource unit corresponds to a synchronization signal and physical broadcast channel block associated with the preamble, wherein mapping of the preamble in the random access occasion to the resource unit in the shared channel occasion is according to a mapping rule, wherein the mapping rule comprises mapping preambles having consecutive identifiers to different shared channel occasions, and wherein the mapping rule is based on a demodulation reference signal port configured for the resource unit and a demodulation reference signal sequence initialization configured for the resource unit; and transmitting configuration information about the association for the random access procedure to a terminal device.

11. The method according to claim 10, wherein the configuration of the shared channel resource comprises:

configuration of shared channel occasions with one or more sizes by enabling the shared channel occasions to be configured with a variable number of physical resource blocks.

12. The method according to claim 10, wherein the mapping rule is further based on one or more following mapping factors:

orthogonality of preambles;

a probability of transmission colliding on the shared channel occasion;

a size of the shared channel occasion; and time resource configured for the resource unit.

13. The method according to claim 12, wherein the mapping factors have different priorities.

14. The method according to claim 12, wherein the mapping rule comprises:

mapping preambles having consecutive identifiers to different shared channel occasions.

15. The method according to claim 10, wherein the mapping rule comprises:

mapping preambles associated with the synchronization signal and physical broadcast channel block to multiple shared channel occasions with different sizes.

16. The method according to claim 10, wherein the shared channel occasion associated with the synchronization signal and physical broadcast channel block is configured with a time resource different from another shared channel occasion associated with a different synchronization signal and physical broadcast channel block.

17. A terminal device, comprising:

one or more processors; and one or more memories comprising computer program codes which, when executed by the one or more processors, cause the terminal device to:

receive configuration information for a random access procedure from a network node; and determine an association between a random access resource and a shared channel resource for the random access procedure, according to the configuration information, wherein the association is based at least in part on a configuration of the shared channel resource, wherein the association maps a preamble in a random access occasion to a resource unit in a shared channel occasion, wherein a time resource configured for the resource unit corresponds to a synchronization signal and physical broadcast channel block associated with the preamble, wherein mapping of the preamble in the random access occasion to the resource unit in the shared channel occasion is according to a mapping rule, wherein the mapping rule comprises mapping preambles having consecutive identifiers to different shared channel occasions, and wherein the mapping rule is based on a demodulation reference signal port configured for the resource unit and a demodulation reference signal sequence initialization configured for the resource unit.

* * * * *